US006933972B2

(12) United States Patent
Suzuki et al.

(10) Patent No.: US 6,933,972 B2
(45) Date of Patent: Aug. 23, 2005

(54) MOS TYPE IMAGE PICKUP DEVICE HAVING PIXEL INTERLEAVED ARRAY LAYOUT AND ONE ANALOG TO DIGITAL CONVERSION UNIT PROVIDED PER EACH PAIR OF ADJACENT PHOTOELECTRIC CONVERSION COLUMNS

(75) Inventors: Nobuo Suzuki, Miyagi (JP); Kazuyuki Masukane, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 861 days.

(21) Appl. No.: 09/779,528

(22) Filed: Feb. 9, 2001

(65) Prior Publication Data

US 2001/0013900 A1 Aug. 16, 2001

(30) Foreign Application Priority Data

Feb. 10, 2000 (JP) .......................................... 2000-033929

(51) Int. Cl.[7] .................................................. H04N 3/14
(52) U.S. Cl. ........................ 348/302; 348/302; 348/315; 250/208
(58) Field of Search ................................ 348/302, 303, 348/304, 315, 311; 250/208; 257/240

(56) References Cited

U.S. PATENT DOCUMENTS

| 4,602,289 | A | * | 7/1986 | Sekine ........................ 348/315 |
| 5,118,924 | A | * | 6/1992 | Mehra et al. ................ 257/659 |
| 5,471,515 | A | * | 11/1995 | Fossum et al. ................ 377/60 |
| 5,479,049 | A | * | 12/1995 | Aoki et al. .................. 257/642 |
| 5,541,402 | A | * | 7/1996 | Ackland et al. .......... 250/208.1 |
| 5,587,596 | A | * | 12/1996 | Chi et al. .................... 257/223 |
| 5,602,585 | A | * | 2/1997 | Dickinson et al. .......... 348/155 |
| 5,693,967 | A | * | 12/1997 | Park et al. .................. 257/223 |
| 5,793,071 | A | * | 8/1998 | Sekine ........................ 257/240 |
| 5,886,659 | A | * | 3/1999 | Pain et al. ................... 341/155 |
| 5,898,168 | A | * | 4/1999 | Gowda et al. ............ 250/208.1 |
| 6,046,466 | A | * | 4/2000 | Ishida et al. ................. 257/258 |
| 6,236,434 | B1 | * | 5/2001 | Yamada ...................... 348/315 |
| 6,344,877 | B1 | * | 2/2002 | Gowda et al. ............ 250/208.1 |
| 6,522,356 | B1 | * | 2/2003 | Watanabe .................... 348/272 |

FOREIGN PATENT DOCUMENTS

| EP | 0 932 302 A2 | * | 1/1999 | ............ H04N/3/15 |
| EP | 0 932 302 A2 | | 7/1999 | |

OTHER PUBLICATIONS

Decker et al., entitled "A 256×256 CMOS Imaging Array with Wide Dynamic Range Pixels and Column–Parallel Digital Output" (IEEE Journal of Solid–State Circuits, vol. 33, No. 12, Dec. 1998).*

Mendis et al., entitled "A 128×128 CMOS Active Pixel Image Sensor for Highly Integrated Imaging Systems" (Electron Devices Meeting, 1993. Technical Digest., International, p. 583–586).*

Patent Abstracts of Japan, vol. 1998, No. 14, Dec. 31, 1998 & JP 10 262260 A, Sep. 29, 1998.

1999 IEEE International Solid–State Circuits Conference, WA 17.7 A 250mW, 60Frames/s 1280×720 Pixel 9b CMOS Digital Image Sensor; Mansoorian et al.

* cited by examiner

Primary Examiner—Wendy R. Garber
Assistant Examiner—Gary C. Vieaux
(74) Attorney, Agent, or Firm—Arent Fox

(57) ABSTRACT

A number of photoelectric conversion elements are disposed in a plurality of rows and columns in a pixel shift layout, and an analog/digital conversion unit is provided per two photoelectric conversion element columns to form a MOS type solid-state image pickup device. It is possible to suppress an increase in the manufacture cost of MOS type solid state image pickup devices with built-in A/D conversion units and improve the integration degree of photoelectric conversion elements.

18 Claims, 13 Drawing Sheets

MOS TYPE IMAGE PICKUP DEVICE HAVING PIXEL INTERLEAVED ARRAY LAYOUT AND ONE ANALOG TO DIGITAL CONVERSION UNIT PROVIDED PER EACH PAIR OF ADJACENT PHOTOELECTRIC CONVERSION COLUMNS

This application is based on Japanese Patent Application 2000-33929 filed on Feb. 10, 2000, the entire contents of which are incorporated herein by reference.

BACKGROUND OF THE INVENTION a) Field of the Invention

The present invention relates to a solid-state image pickup device, and more particularly to a solid-state image pickup device of a MOS (metal oxide semiconductor) type having analog/digital converters.

b) Description of the Related Art

After the establishment of mass production techniques for CCD (charge coupled device), apparatus utilizing CCD type solid-state image pickup devices as line (linear) sensors or area image sensors are rapidly prevailing.

With the spread of portable remote terminals, MOS type solid state image pickup devices having a smaller power consumption than that of CCD type solid image pickup devices, particularly MOS type solid state image pickup devices with built-in analog/digital conversion units (hereinafter abbreviated as "A/D conversion units") for the purposes of high performance and low cost, are under developments. An A/D conversion unit has, for example, a sample/hold circuit unit and an analog/digital converter (hereinafter abbreviated as an "A/D converter") connected to the output of the sample/hold circuit.

A MOS type solid state image pickup device has: a number of photoelectric conversion elements (e.g., photodiodes) disposed in a matrix layout in the principal surface of a semiconductor substrate; a switching circuit unit provided for each photoelectric conversion unit; and an output signal line connecting the switching circuit units and A/D conversion unit for each photoelectric conversion element column. Each switching circuit unit includes an output transistor. This output transistor can generate an electric signal on the output signal line. The power of the electric signal represents an amount of a signal charge accumulated in a corresponding photoelectric conversion element. The output signal line is desired to have a low electric resistance and is generally made of metal material.

A built-in A/D conversion unit of a conventional MOS type solid-state image pickup device is provided per each output signal line electrically connecting to one end thereof. The electric signal generated on the output signal line by the output transistor is input to the AND converter unit. An analog voltage signal is generally input to the A/D conversion unit. The A/D conversion unit outputs a digital signal representing the input analog voltage signal, for example, to a buffer memory.

Generation of an electric signal by the output transistor is controlled, for example, in the unit of a row of photoelectric conversion elements. This control can be conducted by controlling the operation of switching circuit elements in the unit of a row of photoelectric conversion elements. To this end, one row select signal wiring line is provided for each photoelectric conversion element row.

A row select signal is supplied via the row select signal wiring line to corresponding switching circuit units to control the operations of the units.

A scan unit is formed in many cases on the same semiconductor substrate to supply the row select signal to each row select signal wiring line at a predetermined timing.

In this specification, the "photoelectric conversion element column" is intended to mean an "array of photoelectric conversion elements" disposed along an extension direction of the output signal line, among "arrays of photoelectric conversion elements" disposed in the matrix layout. The "photoelectric conversion element row" among the "arrays of photoelectric conversion elements" disposed in the matrix layout is intended to mean an "array of photoelectric conversion elements" disposed along a direction crossing the photoelectric conversion element column direction.

The operations of the scan unit, A/D conversion units, buffer memory and the like are controlled by a control unit. This control unit is formed in many cases on the same semiconductor substrate.

A MOS type solid-state image pickup device with built-in A/D conversion units has a consumption power of about ⅕ to ¹⁄₁₀ that of a CCD-type solid state image pickup device.

In order to improve the resolution of a solid-state image pickup device, it is preferable to form photoelectric conversion elements as many as possible at a high density. A chip size of a solid state image pickup device having a number of pixels or photoelectric conversion elements can be reduced by reducing the size of each pixel or photoelectric conversion element and forming them at a high density on one semiconductor substrate. In this case, a low cost can also be realized.

The higher the integration degree of photoelectric conversion elements on a semiconductor substrate, the pitch between photoelectric conversion elements in the photoelectric conversion element row direction becomes shorter. Namely, the pitch between photoelectric conversion element columns becomes shorter. In the MOS type solid-state image pickup device with built-in A/D conversion units, the pitch between AID conversion units becomes shorter correspondingly.

In a conventional MOS type solid-state image pickup device with built-in A/D conversion units, one output signal line is provided per each photoelectric conversion element column, and one AND conversion unit is provided per each output signal line. The sample/hold circuit unit of the A/D conversion unit has a capacitor of a relatively large electric capacitance in order to stably hold an analog voltage signal.

For example, if the integration degree of photoelectric conversion elements is set so that the pitch between photoelectric conversion elements in the photoelectric conversion element row direction becomes about 4 μm, highly sophisticated micro patterning techniques are required when AND conversion units are formed, and the manufacture cost increases.

SUMMARY OF THE INVENTION

It is an object of the present invention to provide a MOS type solid state image pickup device with built-in A/D conversion units capable of facilitating to improve the integration degree of photoelectric conversion elements while an increase in the manufacture cost is suppressed.

According to one aspect of the present invention, there is provided a solid state image pickup device, comprising: a number of photoelectric conversion elements disposed in a plurality of rows and columns in a surface of a semiconductor substrate, each photoelectric conversion element of a photoelectric conversion element column of an even number being shifted in a column direction by about a half pitch between photoelectric conversion elements in each photoelectric conversion element column, relative to each photoelectric conversion element of a photoelectric conversion element column of an odd number, and each photoelectric conversion element of a photoelectric conversion element row of an even number being shifted in a row direction by about a half pitch between photoelectric conversion elements in each photoelectric conversion element row, relative to each photoelectric conversion element of a photoelectric conversion element row of an odd number, so that each photoelectric conversion element row includes photoelectric conversion elements of only in the odd or even columns; a switching circuit unit provided per each photoelectric conversion element, said switching circuit unit including an output transistor capable of generating an electric signal representing an amount of a signal charge accumulated in a corresponding photoelectric conversion element; a row select signal wiring line provided per each photoelectric conversion element row and extending along a corresponding photoelectric conversion element row, said row select signal wiring line supplying a row select signal to each corresponding switching circuit units, the row select signal controlling generation of the electric signal; an analog/digital conversion unit provided for each pair of adjacent photoelectric conversion element columns; and at least one output signal line provided per each analog/digital conversion unit, the output signal line electrically connecting said analog/digital conversion unit and the output transistor provided for each photoelectric conversion element in at least one of the photoelectric conversion element columns corresponding to said analog/digital conversion unit.

By disposing a number of photoelectric conversion elements in the above manner, an effective integration degree of photoelectric conversion elements in a semiconductor substrate can be improved.

In this specification, the above-described layout of photoelectric conversion elements is called a "pixel shift layout" where applicable. In this specification, "about a half pitch" between photoelectric conversion elements is intended to include "a half pitch" and a pitch which can be regarded as substantially equivalent to "a half pitch" from the viewpoint of the performance and image quality of a solid state image pickup device although this value is different from "a half pitch" because of process errors, rounding errors of each pixel position to be caused by design or mask, and other errors. The pitch between photoelectric conversion elements in the photoelectric conversion element column may be equal to or different from the pitch between photoelectric conversion elements in the photoelectric conversion element row.

With the pixel shift layout of a number of photoelectric conversion elements, one photoelectric conversion element row includes photoelectric conversion elements only in even columns or odd columns. The output transistors corresponding to photoelectric conversion elements in the odd columns generate electric signals on the output signal lines at a timing different from that of the output transistors corresponding to photoelectric conversion elements in the even columns.

Therefore, each A/D conversion unit can receive the electric signals generated by the output transistors corresponding to the photoelectric conversion elements, separately in the odd column and even column, and can generate digital signals representing the electric signals.

One output signal line is provided for each photoelectric conversion element column and formed along this column, and one A/D conversion unit is provided for each pair of adjacent output signal lines.

Alternatively, one output signal line is provided for each pair of adjacent photoelectric conversion element columns with positioning between the pair as viewed in plan, and one A/D conversion unit is provided for each output signal line. In this case, the number of output lines can be reduced.

In each case, the total number of A/D conversion units can be reduced by ½ that of a conventional device. Therefore, even if the effective integration degree of photoelectric conversion elements is made high, A/D conversion units can be formed without using highly sophisticated micro patterning techniques.

DETAILED DESCRIPTION OF THE PREFERRED EMBODIMENTS

Figure 1A:
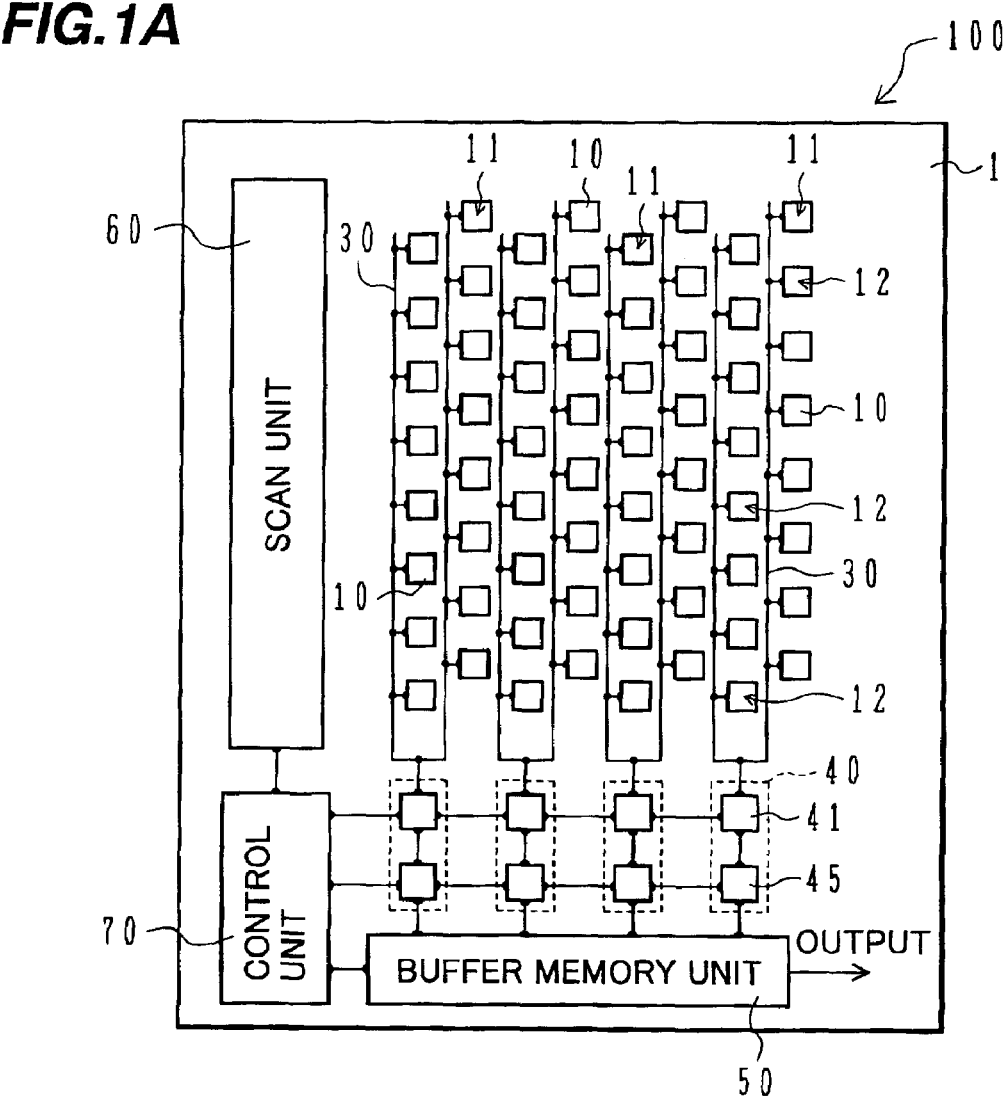
FIGS. 1A is a schematic plan view of a MOS type solid-state image pickup device according to a first embodiment of the invention.

FIG. 1A is a schematic plan view of a MOS type solid-state image pickup device 100 according to the first embodiment. As shown, a number of photoelectric conversion elements or photodiodes 10 are disposed on the principal surface of a semiconductor substrate 1 in a pixel shift layout. In this simplified structure shown in FIG. 1A, the MOS type solid state image pickup device 100 has sixty four photoelectric conversion elements 10 disposed in the pixel shift layout of 16 rows and 8 columns. In an actual MOS type solid-state image pickup device, the total number of photoelectric conversion elements reaches, for example, several hundred thousands to several millions.

If the semiconductor substrate 1 is an n-type silicon substrate having p-type wells, each photoelectric conversion element 10 can be formed, for example, by forming an n-type region in the p-type well. By forming a p$^+$-type region in the surface of the n-type region, a photoelectric conversion element 10 made of a buried type photodiode can be formed. The p-type impurity concentration in the p$^+$-type region is higher than that of the p-type well.

Each of the photoelectric conversion elements 10 is surrounded as viewed in plan by a channel stop region or a field oxide film formed in or on the semiconductor substrate 1, excepting the area used for a read gate. The channel stop region is made of, for example, a p$^+$-type region.

A switching circuit unit, although it is omitted in FIG. 1A, is provided per each photoelectric conversion element 10. Each switching circuit unit includes an output transistor which can generate an electric detection signal representing an amount of a signal charge accumulated in the corresponding photoelectric conversion element 10.

A row select signal wiring line omitted in FIG. 1A is provided per each photoelectric conversion element row 12. Each row select signal wiring line extends along the corresponding photoelectric conversion element row 12. Each row select signal wiring line is electrically connected via the switching circuit units to the photoelectric conversion elements 10 in the corresponding photoelectric conversion element row 12. These row select signal wiring lines are formed, for example, on an electrically insulating layer on the semiconductor substrate 1.

Eight output signal lines 30 are provided one per each photoelectric conversion element column 11. Each output signal line 30 extends along the corresponding photoelectric conversion element column 11 on its left side (left side as viewed in FIG. 1A).

Each output signal line 30 is electrically connected via the switching circuit units to the photoelectric conversion elements 10 in the corresponding photoelectric conversion element column 11. The output transistor of each switching circuit unit can generate an electric detection signal on the corresponding output signal line 30. The power of the electric detection signal represents an amount of the signal charge accumulated in the corresponding photoelectric conversion element 10.

The output signal line 30 is desired to have a low electric resistance, particularly when an electric current is passed through and a stable output is to be realized. The output signal line 30 is made of metal material such as aluminum, aluminum alloy, copper, tungsten, tungsten alloy, molybdenum, and molybdenum alloy.

The output signal line 30 made of metal is formed on an electrically insulating layer on the semiconductor substrate 1 which layer is omitted in FIG. 1A. The output signal line 30 may be made of conductive layers formed in and on the semiconductor substrate 1.

Each output signal line 30 is drawn straight along the photoelectric conversion element column 11 in FIG. 1A for the purposes of convenience. However, as will be later described, each output signal line 30 may be formed in a zigzag way.

Four A/D conversion units 40 are formed on the semiconductor substrate 1, one for each pair of adjacent output signal lines 30. Each AID conversion unit 40 is electrically connected to the corresponding two output signal lines 30.

Each A/D conversion unit 40 includes an AID converter 45. A unit such as a sample/hold circuit unit 41 is formed between the A/D converter 45 and corresponding two output signal lines 30. Each A/D converter 45 sequentially generates and outputs digital signals representing the electric detection signals generated on the corresponding two output signal lines 30.

Since a number of photoelectric conversion elements 10 are disposed in the pixel shift layout, electric detection signals will not be generated at the same time on the two output signal lines 30 corresponding to one A/D conversion unit 40. An electric detection signal is generated on one of the two output signal lines 30 corresponding to one A/D conversion unit 40 at one timing, and another electric detection signal is generated on the other output signal line 30 at another timing.

A buffer memory unit 50 is connected to each A/D conversion unit 40, for example, via a digital bus. This buffer memory unit 50 can be composed by using a semiconductor memory such as DRAM and SRAM.

The buffer memory unit 50 can temporarily hold a digital signal output from each A/D converter unit 40 (A/D converter 45) and can output each held digital signal to an external circuit.

A scan unit 60 is disposed on the semiconductor substrate 1, for example, in the left peripheral area as viewed in FIG. 1A. This scan unit 60 has a function of a first scan unit which supplies row select signals to predetermined row select signal wiring lines omitted in FIG. 1A at a predetermined timing.

For example, the scan unit 60 includes: (i) a shift resister which receives as an input signal a control signal supplied from a control unit 70 during the vertical blanking period and performs a shift operation in response to a horizontal sync pulse; (ii) a circuit for supplying row select signals each of which is a logical product of the output signal of a stage of the shift register and a control signal supplied from the control unit 70 during the horizontal blanking period; and other circuits.

The control unit 70 is disposed on the semiconductor substrate I in the lower left peripheral area as viewed in FIG.

1A. The control unit 70 is electrically connected to the sample/hold circuit units 41, A/D converters 45, the buffer memory unit 50 and the scan unit 60. This control unit 70 functions as a first control unit for controlling the operation of the first scan unit, a fourth control unit for controlling the operation of the A/D conversion units 40 and a fifth control unit for controlling the operation of the buffer memory unit 50.

For example, the control unit 70 includes a clock counter, a reference voltage generator, a clock generator, a vertical/horizontal sync pulse generator, a generator for generating various control signals, and the like.

Figure 1B:
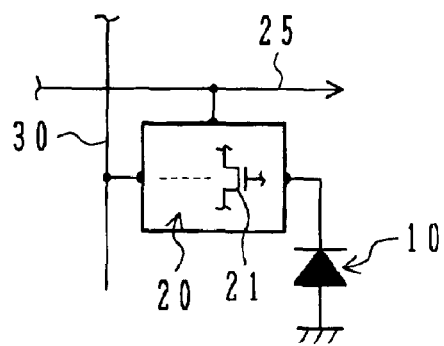
FIG. 1B is a conceptual diagram showing one switching circuit unit.

FIG. 1B is a conceptual diagram showing one switching circuit unit 20 omitted in FIG. 1A.

Each switching circuit unit 20 is electrically connected to the corresponding photoelectric conversion element 10 and output signal line 30, and to the row select signal wiring line 25 omitted in FIG. 1A.

Each row select signal wiring line 25 is made of conductive material such as polysilicon, polycide (a stacked layer of polysilicon and silicide), tungsten, tungsten alloy, molybdenum and molybdenum alloy.

The switching circuit unit 20 includes an output transistor 21. The scan unit 60 having the function of the first scan unit, the first scan unit formed on another chip, or the like supplies the switching circuit unit 20 with the row select signal via the row select signal wiring line 25 at a predetermined timing. As the row select signal is supplied to the switching circuit unit 20, the output transistor 21 of this switching circuit unit 20 can generate the electric detection signal on the output signal line 30. The power of the electric detection signal represents an amount of the signal charge accumulated in the corresponding photoelectric conversion element 10.

The structure of this switching circuit unit 20 is not limited only to that described above. For example, the photoelectric conversion element 10 may be electrically connected to an output current terminal of the output transistor 21.

For example, a row select transistor is serially connected to the output transistor 21 and the corresponding output signal line 30. The row select transistor controls the output transistor 21 to generate the electric detection signal on the output signal line 30. In this case, the corresponding row select signal wiring line 25 is electrically connected to the control terminal of the row select transistor. The output transistor 21 receives at its control terminal a signal representing the amount of the signal charge accumulated in the corresponding photoelectric conversion element 10 and a power supply voltage is applied to the remaining current terminal (drain).

For example, a reset transistor is provided for the photoelectric conversion element 10. The reset transistor controls to drain a signal charge accumulated in the photoelectric conversion element 10 from which the electric detection signal was generated, for example, to a power supply voltage wiring line. To this end, the control terminal of the reset transistor is electrically connected to a reset signal supply wiring line. The reset signal supply wiring line supplies the reset signal to the corresponding reset transistor at a predetermined timing. When the reset signal is input, the reset transistor turns on so that the signal charge in the corresponding photoelectric conversion element 10 can be drained, for example, to the power supply voltage wiring line.

For example, a transfer transistor is provided for the photoelectric conversion element 10. The transfer transistor is connected between the corresponding photoelectric conversion element 10 and output transistor 21 to control the supply of a signal from the photoelectric conversion element 10 to the control terminal of the output transistor 21. To this end, the control terminal of the transfer transistor is electrically connected to a transfer control signal supply wiring line. The transfer control signal supply wiring line supplies a transfer control signal to the corresponding transfer transistor at a predetermined timing. When the transfer control signal is input, the transfer transistor turns on so that a signal can be supplied from the corresponding photoelectric conversion element 10 to the output transistor 21.

Figure 2:
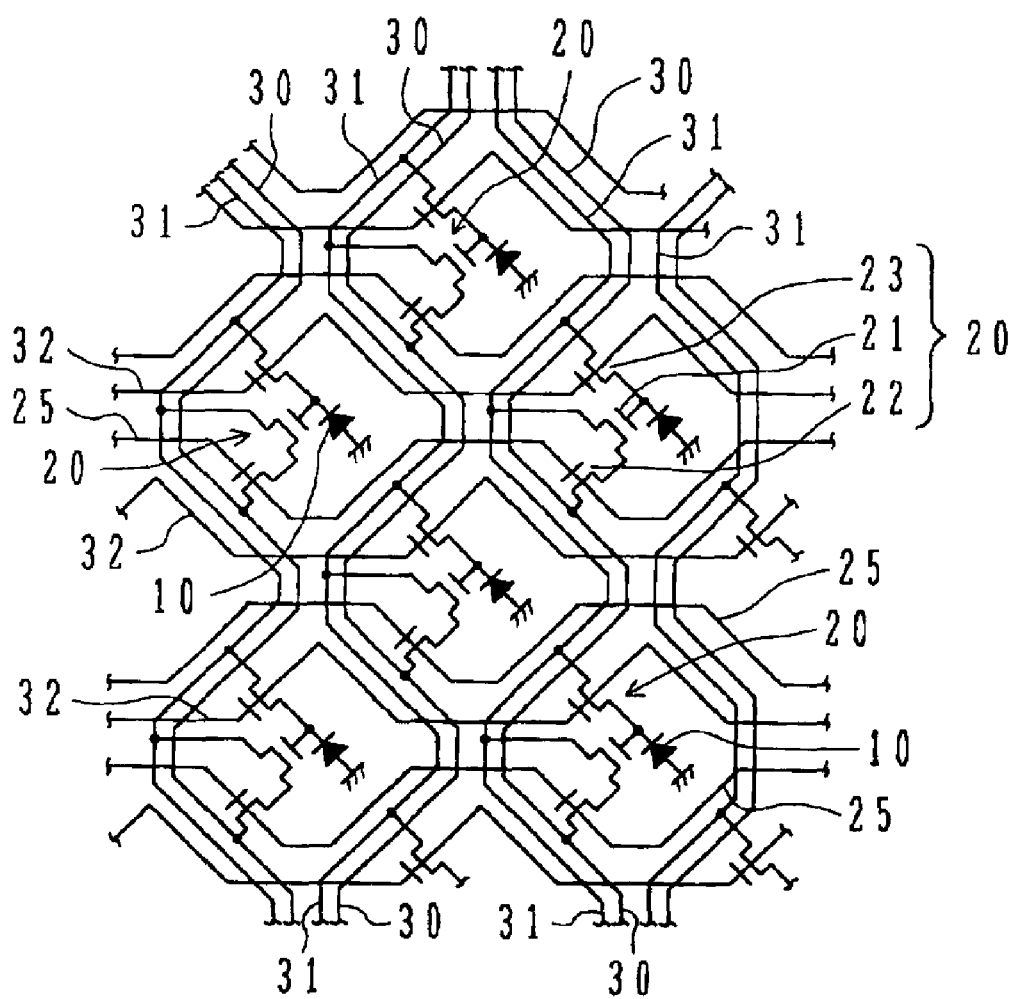
FIG. 2 is an equivalent circuit diagram schematically showing an example of the switching circuit units and photoelectric conversion elements of the MOS type solid-state image pickup device of the first embodiment.

FIG. 2 is a diagram showing an example of an equivalent circuit of the switching circuit unit 20 provided for each photoelectric conversion element 10 of the MOS type solid-state image pickup device 100. In FIG. 2, those elements already described with reference to FIGS. 1A and 1B are represented by using identical reference numerals used in FIG. 1A or 1B, and the description thereof is omitted.

Each switching circuit unit 20 shown in FIG. 2 has the output transistor 21, row selection transistor 22 and reset transistor 23. These transistors are, for example, MOS transistors.

The control terminal (gate) of the output transistor 21 is electrically connected to the corresponding photoelectric conversion element 10. The drain of the output transistor 21 is electrically connected to the corresponding power supply voltage wiring line 31.

The power supply voltage wiring line 31 is provided per each photoelectric conversion element column 11 and extends along the photoelectric conversion element column 11 on its left side (left side as viewed in FIG. 2). A power supply voltage is applied to each power supply voltage wiring line 31.

Similar to the output signal line 30, the power supply voltage wiring line 31 is made of metal material such as aluminum, aluminum alloy, copper, tungsten, tungsten alloy, molybdenum, and molybdenum alloy.

Each row select transistor 22 is serially connected to the corresponding output transistor 21 and is connected to the power supply voltage wiring line 31. The control terminal (gate) of each row select transistor 22 is electrically connected to the corresponding row select signal wiring line 25. A portion of the row select signal wiring line 25 may be used as the gate electrode of the row select transistor 22.

Each row select transistor 22 is controlled to be turned on and off by the row select signal supplied from the corresponding row select signal wiring line 25. When the row select transistor 22 turns on, the corresponding output transistor 21 generates the electric detection signal on the output signal line 30. The power of the electric detection signal represents the amount of the signal charge accumulated in the photoelectric conversion element 10.

Each reset transistor 23 is provided between the corresponding power supply voltage wiring line 31 and photoelectric conversion element 10 and connected to the control terminal of the corresponding output transistor 21 and power supply voltage wiring line 31. The control terminal (gate) of each reset transistor 22 is electrically connected to the corresponding reset signal supply wiring line 32. A portion of the reset signal supply wiring line 32 may be used as the gate electrode of the reset transistor 22.

The reset signal supply wiring line 32 is provided per each photoelectric conversion element row 12 and extends along the corresponding photoelectric conversion element row on the upper side (upper side as viewed in FIG. 2).

Each reset signal supply wiring line 32 transmits a reset signal supplied from the second scan unit at a predetermined timing to corresponding reset transistors 23. For example, the scan unit 60 shown in FIG. 1A functions as the second scan unit. The second scan unit is controlled by the second control unit. For example, the control unit 70 shown in FIG. 1A functions as the second control unit.

Each reset signal supply wiring line 32 is made of conductive material such as polysilicon, polycide, tungsten, tungsten alloy, molybdenum and molybdenum alloy.

Each reset transistor 23 is controlled to be turned on and off in response to the reset signal supplied from the corresponding reset signal supply wiring line 32. When the reset transistor 23 turns on, the signal charge accumulated in the corresponding photoelectric conversion element 10 is drained to the corresponding power supply voltage wiring line 31.

Figure 3:
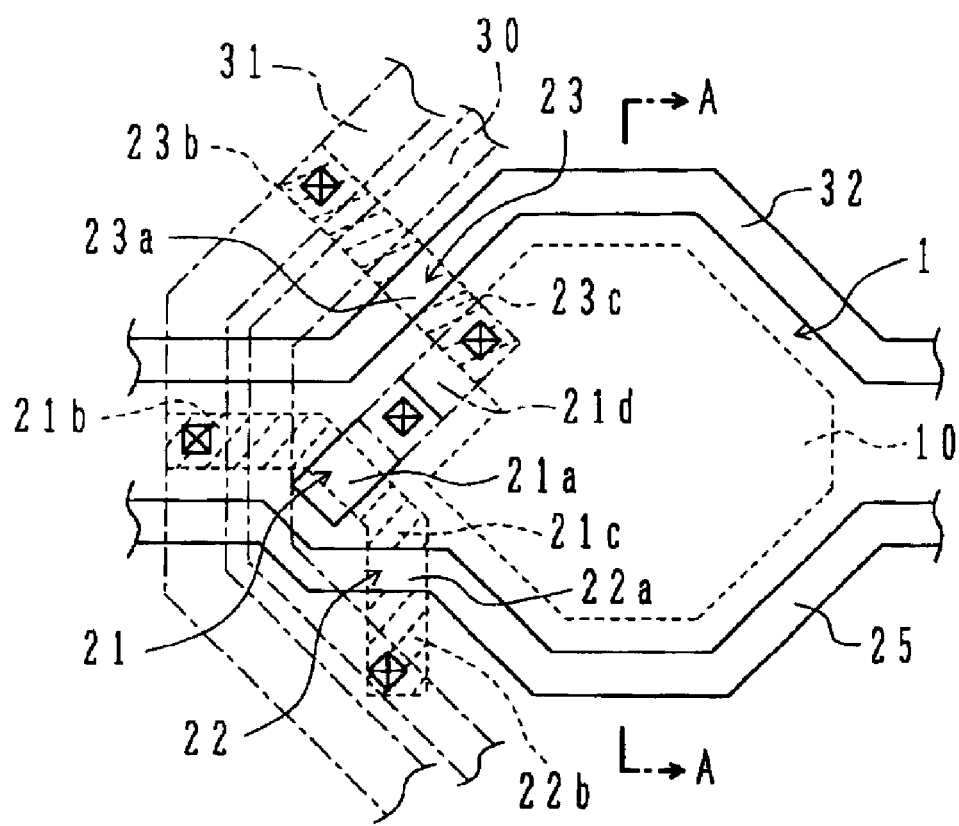
FIG. 3 is a schematic diagram showing an example of a plan layout of the photoelectric conversion element and the switching circuit unit provided for the photoelectric conversion element constituting the MOS type solid-state image pickup device of the first embodiment.

FIG. 3 is a schematic plan view showing an example of the plan layout of the photoelectric conversion element 10 and its switching circuit unit 20. Constituent elements already described with reference to FIG. 2 are represented by identical reference numerals used in FIG. 2 and the description thereof is omitted. In FIG. 3, a gate electrode 21a, a metal wiring line 21d, the row select signal wiring line 25, output signal line 30, power supply voltage wiring line 31 and reset signal supply wiring line 32 are drawn by lines of different kinds so as to facilitate discrimination therebetween.

As shown in FIG. 3, for example, the output transistor 21 includes the gate electrode 21a formed above the semiconductor substrate 1 and impurity diffusion regions (n-type regions) 21b and 21c formed on both sides of the gate electrode 21a.

One end portion of the impurity diffusion region (n-type region) 21b crosses as viewed in plan the power supply voltage wiring line 31 in its predetermined area whereat they are electrically connected. One end portion of the impurity diffusion region (n-type region) 21c reaches as viewed in plan a partial side of the row select signal wiring line 25.

For example, the gate electrode 21a is made of a polysilicon layer formed on an electrically insulating film formed through thermal oxidation of the semiconductor substrate 1. This gate electrode 21a is electrically connected to the photoelectric conversion element 10, for example, by the metal wiring line 21d. The metal wiring line 21d is formed on an electrically insulating layer omitted in FIG. 3 above the semiconductor substrate 1.

The metal wiring line 21d and gate electrode 21a are insulated by the electrically insulating layer except a contact area. The metal wiring line 21d and photoelectric conversion element 10 are also insulated by the electrically insulating layer, excepting a contact area.

A square symbol with a cross therein shown in FIG. 3 indicates a contact area.

As shown in FIG. 3, for example, the row select transistor 22 includes the gate electrode 22a made of a predetermined portion of the row select signal wiring line 25 and impurity diffusion regions (n-type regions) 21c and 22b formed on both sides of the gate electrode 22a. An electrically insulating film omitted in FIG. 3 is interposed between the row select signal wiring line 25 and semiconductor substrate 1. One end portion of the impurity diffusion region (n-type region) 22b crosses as viewed in plan a predetermined portion of the output signal line 30 whereat they are electrically connected.

In the cross area as viewed in plan between the row select signal wiring line 25 and output signal line 30, for example, the output signal line 30 is formed at the position higher than the row select signal wiring line 25 as viewed from the semiconductor substrate 1 side. The row select signal wiring line 25 and output signal line 30 are insulated by an electrically insulating layer omitted in FIG. 3.

As shown in FIG. 3, for example, the reset transistor 23 includes the gate electrode 23a made of a predetermined portion of the reset signal supply wiring line 32 and impurity diffusion regions (n-type regions) 23b and 23c formed on both sides of the gate electrode 23a. An electrically insulating film omitted in FIG. 3 is interposed between the reset signal supply wiring line 32 and semiconductor substrate 1.

One end portion of the impurity diffusion region (n-type region) 23b crosses as viewed in plan a predetermined portion of the power supply voltage wiring line 31 whereat they are electrically connected. One end portion of the impurity diffusion region (n-type region) 23c crosses as viewed in plan a predetermined portion of the photoelectric conversion element 10 whereat they are electrically connected.

In the cross area as viewed in plan between the reset signal supply wiring line 32 and power supply voltage wiring line 31, for example, the power supply voltage wiring line 31 is formed at the position higher than the reset signal supply wiring line 32 as viewed from the semiconductor substrate 1 side. Similarly, in the cross area as viewed in plan between the reset signal supply wiring line 32 and output signal line 30, for example, the output signal line 30 is formed at the position higher than the reset signal supply wiring line 32 as viewed from the semiconductor substrate 1 side.

Either one of the output signal lines 30 and power supply voltage line 31 may be formed at a higher position as viewed from the semiconductor substrate 1 side, or both of them may be formed on the same electrically insulating layer.

The reset signal supply wiring line 32, power supply voltage wiring line 31, output signal line 30 and row select signal wiring line 25 are insulated by electrically insulating layers omitted in FIG. 3.

The output signal line 30 and power supply voltage wiring line 31 can be disposed as viewed in plan in a zigzag way along the corresponding photoelectric conversion element column 11 (refer to FIG. 1A) as shown in FIG. 2. Even if the lengths of the output signal line 30 and power supply voltage wiring line 31 are elongated to some extent, no practical problem occurs because they are made of metal material.

If the area of the photoelectric conversion element 10 and its nearby area is represented by an octagon, each photoelectric conversion element column 11 (refer to FIG. 1A) can be regarded as eight octagons spaced by a predetermined distance and disposed in the same direction at a predetermined pitch. The output signal line 30 and power supply voltage wiring line 31 corresponding to one photoelectric conversion element column 11 can be extended as viewed in plan in a zigzag way along the sides of the octagons and the photoelectric conversion element column 11 on the left side. In the area separating two adjacent octagons in the column direction, the output signal line 30 and power supply voltage wiring line 31 can be extended as viewed in plan along the extension direction (column direction) of the photoelectric conversion element column 11. The octagon has two sides parallel to the extension direction of the photoelectric conversion element column 11 and two sides parallel to the extension direction of the photoelectric conversion element row 12, all the interior angles being obtuse angles.

Similarly, the row select signal wiring line 25 and reset signal supply wiring line 32 can be extended as viewed in plan in a zigzag way along the photoelectric conversion element row 12 (refer to FIG. 1A).

The row select signal wiring line 25 shown in the equivalent circuit of FIG. 2 has a shape different from that as viewed in plan of the row select signal wiring line 25 shown in FIG. 3 because of different ways to draw them. Similarly, the reset signal supply wiring line 32 shown in the equivalent circuit of FIG. 2 has a shape different from that as viewed in plan of the reset signal supply wiring line 32 shown in FIG. 3 because of different ways to draw them.

The shapes as viewed in plan of the row select signal wiring line 25 and reset signal supply wiring line 32 may be selectively set as desired. The shapes as viewed in plan of the output signal line 30 and power supply voltage wiring line 31 may also be selectively set as desired.

If the shapes as viewed in plan of the output signal line 30 and power supply voltage wiring line 31 are set as zigzag shapes, these shapes are not limited only to that described above. Instead of the octagon, other shapes such as a rectangle, a pentagon, a hexagon, a circle and an ellipsoid may be used for representing the area of the photoelectric conversion element 10 and its nearby area. It is not necessarily required to extend in a zigzag way the output signal line 30 and power supply voltage wiring line 31 along the sides of the represented shape.

In the MOS type solid-state image pickup device 100 of this embodiment, each photoelectric conversion element 10 performs photoelectric conversion and accumulates signal charge. When signal charge is accumulated in the photoelectric conversion element 10, an electric signal (voltage) representing the amount of the accumulated signal charge is applied to the gate electrode 21*a* of the corresponding output transistor 21 and the electric resistance of the output transistor 21 changes.

When the scan unit 60 shown in FIG. 1A applies the row select signal to a predetermined row select signal wiring line 25, the row select transistors 22 electrically connected to the row select signal wiring line 25 turn on. Therefore, the output transistors 21 corresponding to these row select transistors 22 are electrically connected to the corresponding output signal lines 30 and power supply voltage wiring lines 31. A load transistor 35 to be described later is provided for each pair of adjacent output signal lines 30 electrically connecting therewith. A voltage representing the electric resistance value between the output transistor 21 and load transistor 35 appears on the corresponding output signal line 30.

The A/D conversion unit 40 shown in FIG. 1A generates a digital signal representing the electric detection signal generated on the output signal line 30 and outputs this digital signal to the buffer memory unit 50.

Figure 4:
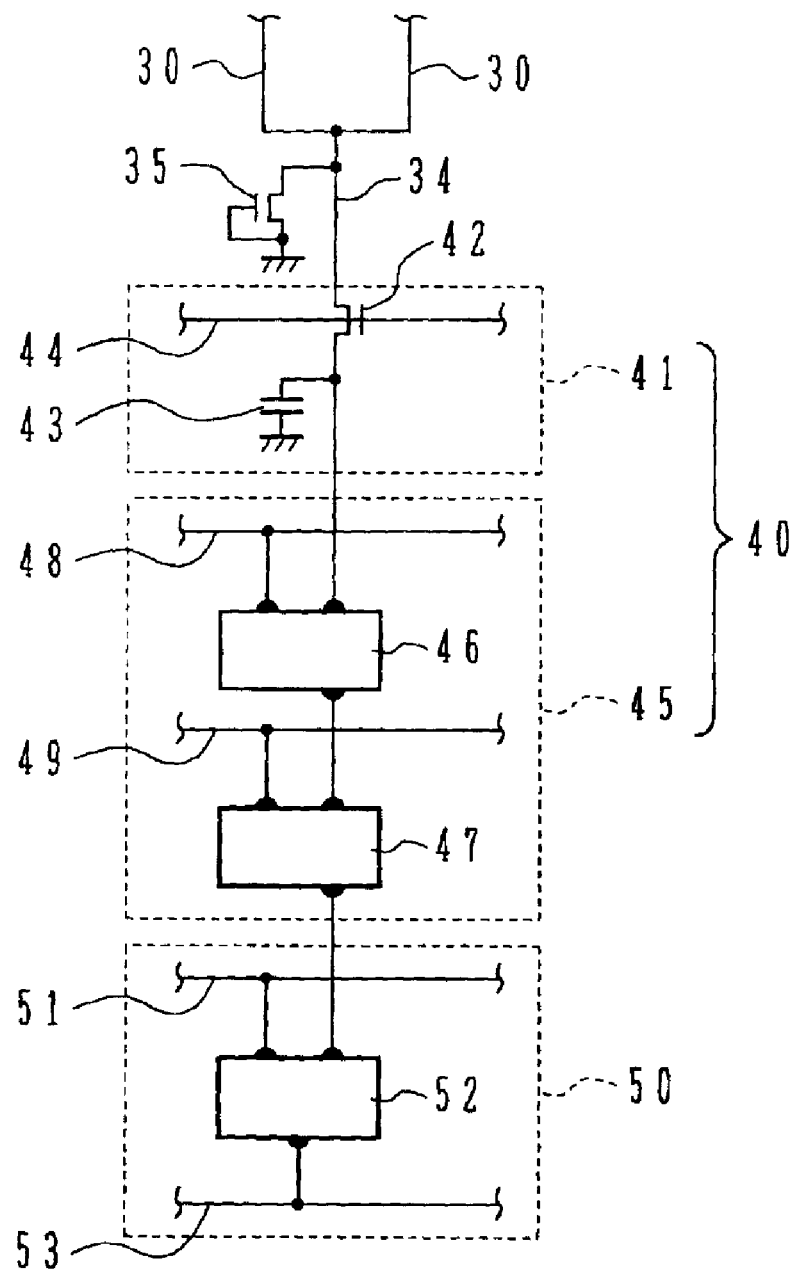
FIG. 4 is a schematic diagram showing one A/D conversion unit and a portion of a buffer memory unit of the MOS type solid-state image pickup device of the first embodiment.

FIG. 4 is a schematic diagram showing one AND conversion unit 40 shown in FIG. 1A and a portion of the buffer memory unit 50.

As described earlier, each A/D conversion unit 40 shown in FIG. 4 has an A/D converter 45 and a sample/hold circuit unit 41. The sample/hold circuit unit 41 is connected between the AND converter 45 and a pair of adjacent output signal lines 30 corresponding to the A/D converter 45.

In the structure shown in FIG. 4, one ends of the two output signal lines 30 are connected in common to a wiring line 34 which is connected to the A/D conversion unit 40. The load transistor 35 is connected to the wiring line 34.

As the output transistor 21 (refer to FIG. 2 or 3) changes its electric resistance with the amount of the signal charge accumulated in the photoelectric conversion element 10, an electric detection signal (analog voltage signal) representing the amount of the signal charge appears at the connection point between the output signal lines 30 (wiring line 34) and load transistor 35.

Each photoelectric conversion element row 12 has photoelectric conversion elements 10 only in the even or odd columns. Therefore, each load transistor 35 is electrically connected to the output signal line 30 corresponding to the odd photoelectric conversion element column 11 and the output signal line 30 corresponding to the even photoelectric conversion element column 11. Two or more switching circuit units 20 are not electrically connected at the same time to one load transistor 35.

The analog voltage signal generated on the load transistor 35 (output signal line 30, wiring line 34) is supplied to the sample/hold circuit unit 41 of the corresponding AID conversion unit 40.

The sample/hold circuit unit 41 includes, for example, a sampling transistor 42 and a capacitor 43 electrically connected to the output side of the transistor 42.

A sampling signal supply wiring line 44 is connected to the control terminal of the sampling transistor 42. The operation of the sampling transistor 42 is controlled by a sampling control signal supplied via the sampling signal supply wiring line 44 from the control unit 70 (refer to FIG. 1A) also serving as the fourth control unit.

When the sampling transistor 42 is turned on by the sampling control signal, the analog voltage signal is supplied (sampled) to the capacitor 43. When the sampling transistor 42 is turned off thereafter, the capacitor 43 is electrically disconnected and holds the sampled voltage. For example, if the photoelectric conversion element 10 accumulates electrons representing an incident light intensity, the voltage held by the capacitor 43 becomes lower the higher the incident light intensity.

The A/D converter 45 includes, for example, a comparator 46 and a latch circuit 47. For example, one input terminal of the comparator 46 is input with a reference voltage signal having a saw tooth waveform lowering its voltage on a predetermined gradient supplied from the control unit 70 (refer to FIG. 1A) also serving as the fourth control unit via a reference voltage signal supply wiring line 48. The other input terminal of the comparator 46 is input with the analog voltage signal (hereinafter called a "voltage I") held by the capacitor 43. The comparator 46 compares the voltage of the voltage I with the voltage of the reference voltage signal. When the voltage of the voltage I become equal to the voltage of the reference voltage signal, the comparator 46 outputs a control operation signal to the latch circuit 47.

A count signal is supplied to the latch circuit 47, via a count signal supply wiring line 49, from the control unit 70 (refer to FIG. 1A) also serving as the fourth control unit.

The latch circuit 47 latches the count of the count signal when the control operation signal is supplied from the comparator 46. The latched count corresponds to the analog voltage signal supplied to the sample/hold circuit unit 41. Therefore, it corresponds to a digital signal representative of the amount of the signal charge accumulated in the photoelectric conversion element 10. The latch circuit 47 outputs the count to the buffer memory unit 50.

A control signal is supplied to the buffer memory unit 50, via a control signal supply wiring line 51, from the control unit 70 (refer to FIG. 1A) also serving as the fifth control unit. The count input from the latch circuit 47 is stored in a predetermined memory 52 of the buffer memory unit 50, in accordance with the control signal supplied to the buffer memory unit 50.

The count stored in the memory 52 is output to a digital output bus 53 in accordance with another control signal supplied from the control unit 70 (refer to FIG. 1A) via a control signal supply wiring line 51.

Figure 5:
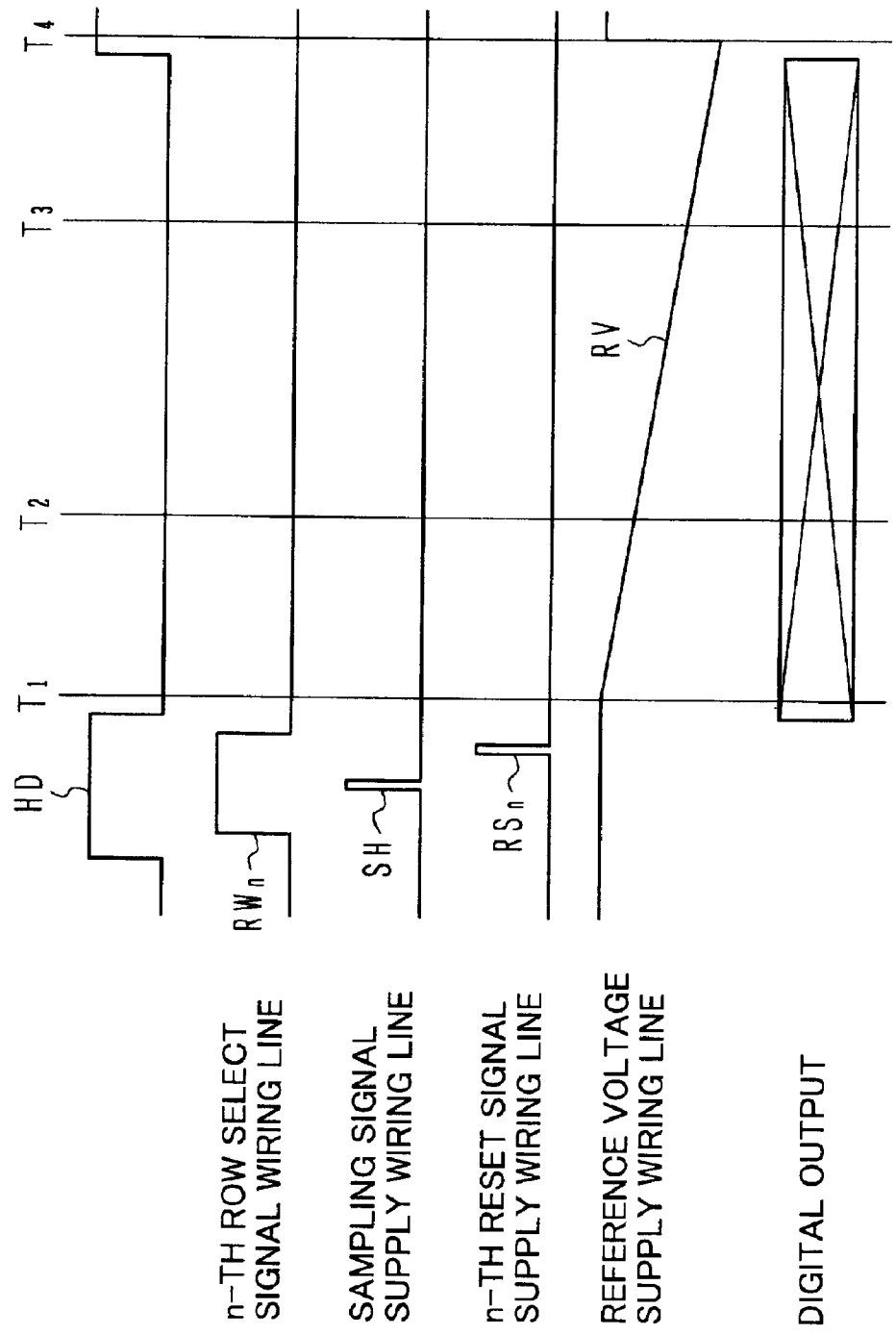
FIG. 5 is a timing chart illustrating an example of timings for supplying various signal pulses used during the operation of the MOS type solid-state image pickup device of the first embodiment.

With reference to FIG. 5, an example of the operation of the MOS type solid-state image pickup device 100 will be described. For the purposes of convenience, photoelectric conversion element rows are called a first photoelectric conversion element row, a second photoelectric conversion element row, . . . , a fifteenth photoelectric conversion element row and a sixteenth photoelectric conversion element row, in the order nearer to the A/D conversion unit 40. A photoelectric conversion element constituting an n-th (n is an integer of 1 to 16) photoelectric conversion element row is called an n-th row photoelectric conversion element, a row select signal wiring line corresponding to the n-th (n is an integer of 1 to 16) photoelectric conversion element row is called an n-th row select signal wiring line, and a reset signal supply wiring line corresponding to the n-th (n is an integer of 1 to 16) photoelectric conversion element row is called an n-th row reset signal supply wiring line.

As the horizontal blanking period starts in response to a horizontal sync pulse HD, the control unit 70 supplies a predetermined control signal to the scan unit 60. In response to this control signal, the scan unit 60 supplies a row select signal $RW_n$ to the n-th row select signal wiring line 25. The row select transistors 22 electrically connected to the n-th row select signal wiring line 25 are turned on. Each output transistor 21 receiving at its gate the accumulation voltage of corresponding n-th row photoelectric conversion element 10 is electrically connected to the corresponding power supply voltage wiring line 31 and output signal line 30. On each output signal line 30, an electric detection signal representing the amount of the signal charge accumulated in corresponding n-th row photoelectric conversion element 10 is generated.

Prior to supplying the row select signal $RW_n$, the following operation is performed if the count representing the electric detection signal of (n−1)-th row photoelectric conversion element 10 is being latched by the latch circuit 47. In this case, the control unit 70 supplies a predetermined control signal to the control signal supply wiring line 51 to store the count latched by the latch circuit 47 in the memory 52.

When the electric detection signal representing the amount of the signal charge accumulated in n-th row photoelectric conversion element 10 is generated on the output signal line 30, an analog voltage signal representing the electric detection signal appears at the connection point between the output signal line 30 (wiring line 34) and load transistor 35. The analog voltage signal is supplied to the sample/hold circuit unit 41 of the A/D conversion unit 40 corresponding to the load transistor 35.

During the period while the row select signal $RW_n$ is supplied to the n-th row select signal wiring line 25, the control unit 70 applies a sampling control signal SH to the sampling signal supply wiring line 44. While the sampling control signal SH takes a high level, each sampling transistor 42 turns on so that the analog voltage signal is sampled by each corresponding capacitor 43. When the sampling control signal SH takes a low level, each sampling transistor 42 turns off so that each capacitor 43 holds the sampled analog voltage signal.

After the sampling control signal SH is supplied, the control unit 70 controls the scan unit 60 so that a reset signal $RS_n$ is applied to the n-th reset signal supply wiring line 32. Each n-th row reset transistor 23 connected to the n-th reset signal supply wiring line 32 turns on. The signal charge accumulated in each n-th row photoelectric conversion element 10 is drained to the corresponding power supply voltage wiring line 31. After the reset signal $RS_n$ takes a low level, each n-th photoelectric conversion element 10 drained its signal charge can start accumulation of next signal charge.

After the termination of the horizontal blanking period, the control unit 70 supplies a predetermined control signal to the buffer memory unit 50 via the control signal supply wiring line 51. In response to this control signal, the buffer memory unit 50 outputs the count stored in each memory 52, i.e., the count representing the electric detection signal from corresponding (n−1)-th photoelectric conversion element 10, to the digital output bus 53. Each count output to the digital output bus 53 is output to the external circuit as digital image data of each (n−1)-th row photoelectric conversion element 10.

At a predetermined time $T_1$ after the termination of the horizontal blanking period, a clock counter in the control unit 70 starts counting. The control unit 70 supplies this count signal to each latch circuit 47 via the count signal supply wiring line 49. The level of the reference voltage signal RV generated by the reference voltage generator of the control unit 70 lowers on a constant gradient from the time $T_1$. Namely, a saw tooth voltage waveform lowering its level on the constant gradient is generated. The reference voltage signal RV is supplied to each comparator 46 via the reference voltage signal supply wiring line 48. The counting operation by the clock counter and the lowering of the level of the reference voltage signal RV continue until a predetermined time $T_4$. The reference voltage signal RV may be a saw tooth voltage waveform raising its level on a constant gradient. Any waveform may be used so long as the voltage value can be represented by the count.

As the analog voltage signal representing the amount of the signal charge accumulated in corresponding n-th row photoelectric conversion element 10 is held in each capacitor 43, the voltage I representing the analog voltage signal is applied to the corresponding comparator 46.

Each comparator 46 compares the voltage of the reference voltage signal RV with the voltage of the voltage I. When the voltage of the voltage I becomes equal to the voltage of the reference voltage signal RV, the comparator 46 outputs the control operation signal to the corresponding latch circuit 47.

Each latch circuit 47 latches the count of the count signal supplied via the count signal supply wiring line 49 when the control operation signal is supplied from the corresponding comparator 46. Each count latched by each latch circuit 47 corresponds to a digital signal (digital image data) representing the amount of the signal charge accumulated in the corresponding n-th row photoelectric conversion element 10.

For example, if the comparator 46 outputs the control operation signal to the latch circuit 47 at a time $T_2$ shown in FIG. 5, the count latched by the latch circuit 47 is relatively small. If the MOS type solid-state image pickup device 100 is a black and white solid-state image pickup device, the count corresponds to a digital signal representative of dark gray. Similarly, for example, if the comparator 46 outputs the control operation signal to the latch circuit 47 at a time $T_3$ shown in FIG. 5, the count latched by the latch circuit 47 is relatively large. If the MOS type solid-state image pickup device 100 is a black and white solid-state image pickup device, the count corresponds to a digital signal representative of bright gray.

Thereafter, as the next horizontal blanking period starts in response to a horizontal sync pulse HD, the row select signal $RW_{n+1}$ is supplied to the (n+1)-th row select signal wiring line 25 to perform operations similar to those described above. First, each latch circuit 47 outputs the count (digital image data) representing the amount of the signal charge accumulated in the corresponding n-th photoelectric conversion element 10 to the buffer memory unit 50. Thereafter, each latch circuit 47 latches the count (digital image data) representing the amount of the signal charge accumulated in the corresponding (n+1)-th photoelectric conversion element 10.

The operations similar to those described above are performed until digital signals (digital image data) of one frame are obtained while the horizontal blanking periods are repeated.

Digital image data of progressive scanning is obtained by repeating the above-described operations sequentially in the ascending order from the first photoelectric conversion element row or in the descending order from the sixteenth photoelectric conversion element row.

In obtaining digital image data of interlace scanning, first and second fields are selected. For example, the first and second, fifth and sixth, ninth and tenth, and thirteenth and fourteenth photoelectric conversion element rows are selected as the first field, and the third and fourth, seventh and eighth, eleventh and twelfth, and fifteenth and sixteenth photoelectric conversion element rows are selected as the second field. The above-described operations are performed for each selected field sequentially in the ascending or descending order to obtain digital image data of interlace scanning.

In obtaining digital image data for high speed thinning scanning, first, a desired number of photoelectric conversion element rows are selected. In order to obtain digital image data thinned by ¼ in the photoelectric conversion element column direction, for example, (1) the first, second, ninth and tenth photoelectric conversion element rows, (2) the third, fourth, eleventh and twelfth photoelectric conversion element rows, (3) the fifth, sixth, thirteenth and fourteenth photoelectric conversion element rows, or (4) the seventh, eighth, fifteenth and sixteenth photoelectric conversion element rows, may be selected. The above-described operations are performed for the selected photoelectric conversion element rows sequentially in the ascending or descending order to obtain digital image data of high speed thinning scanning.

Next, a MOS type solid-state image pickup device according to a modification of the first embodiment will be described with reference to FIG. 6.

Figure 6:
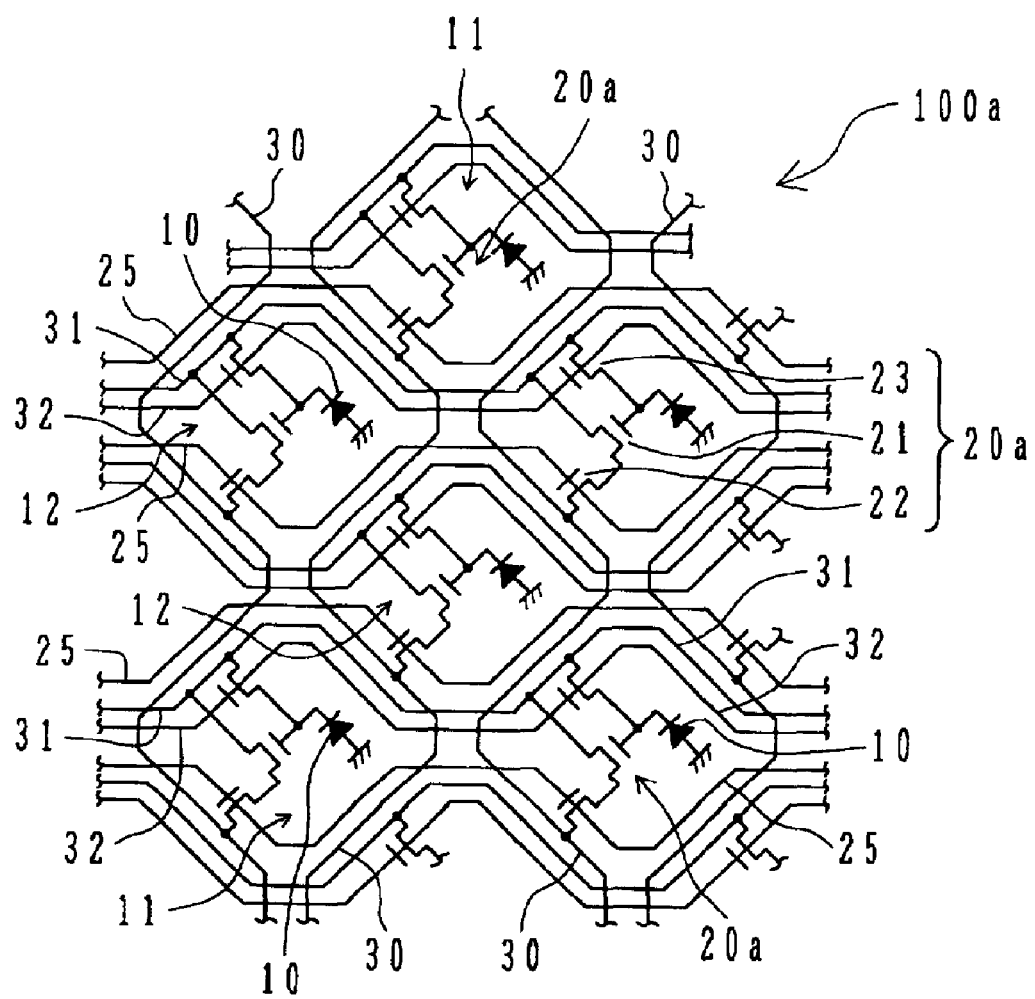
FIG. 6 is an equivalent circuit schematically showing an example of the switching circuit units and photoelectric conversion elements of a MOS type solid-state image pickup device according to a modification of the first embodiment.

FIG. 6 is a diagram showing an example of the equivalent circuit of switching circuit units 20a and the photoelectric conversion elements 10 constituting a MOS type solid-state image pickup device 100a according to the modification.

As shown in FIG. 6, in the MOS type solid-state image pickup device 100a, a power supply voltage wiring line 31 is disposed for each photoelectric conversion element row 12 and extends along the corresponding row 12. Other structures are similar to those of the MOS type solid-state image pickup device 100 of the first embodiment.

Only an equivalent circuit diagram of the switching circuit units 20a and photoelectric conversion elements 10 of the MOS type solid-state image pickup device 100a are therefore shown in FIG. 6 and other portions are omitted. In FIG. 6, constituent elements already described with reference to FIG. 1A or 2 are represented by using identical reference numerals used in FIG. 1A or 2 and the description thereof is omitted.

In the MOS type solid state image pickup device 100a, the output signal lines 30 and power supply voltage wiring lines 31 are disposed crossing each other so that different wiring layers for forming these lines are required.

The operation of the MOS type solid-state image pickup device 100a is similar to that of the MOS type solid-state image pickup device 100 of the first embodiment, and so the description thereof is omitted.

A MOS type solid-state image pickup device according to another modification of the first embodiment will be described with reference to FIG. 7.

Figure 7:
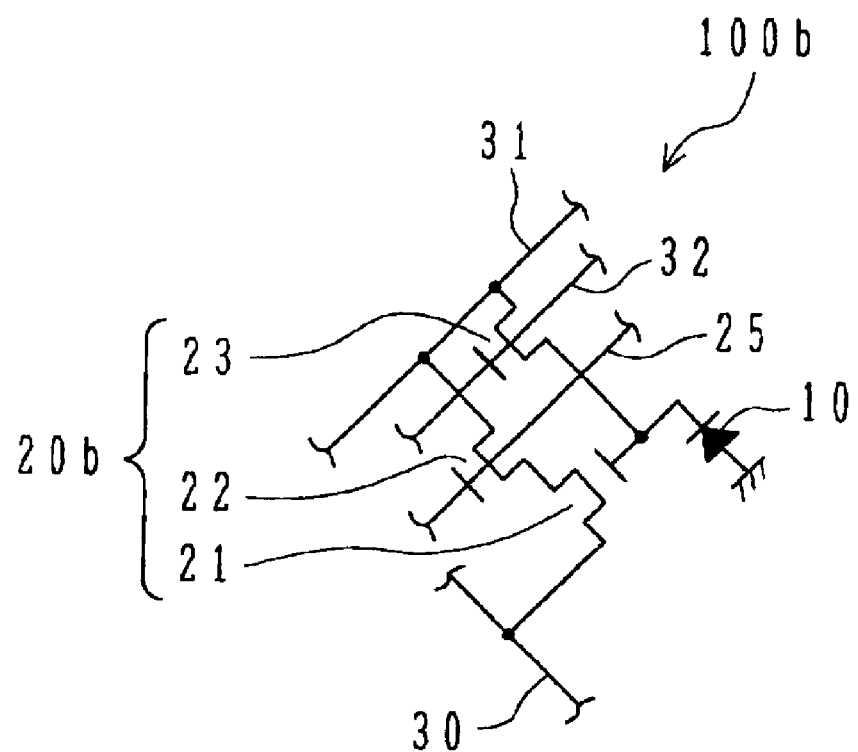
FIG. 7 is an equivalent circuit schematically showing an example of the switching circuit unit and a photoelectric conversion element of a MOS type solid-state image pickup device according to another modification of the first embodiment.

FIG. 7 is a diagram showing an example of the equivalent circuit of a switching circuit unit 20b and the photoelectric conversion element 10 constituting a MOS type solid-state image pickup device 100b according to the modification.

As shown in FIG. 7, in the MOS type solid-state image pickup device 100b, the row select transistor 22 is connected to the power supply voltage wiring line 31, and the output transistor 21 is connected to the row select transistor 22 and output signal line 30. A row select signal wiring line 25 is disposed for each photoelectric conversion element row. Each row select signal wiring line 25 extends along the corresponding photoelectric conversion element row on the upper side thereof (upper side as viewed in FIG. 7). Other structures are similar to those of the MOS type solid-state image pickup device 100 of the first embodiment.

Only an equivalent circuit diagram of the switching circuit unit 20b and the photoelectric conversion element 10 of the MOS type solid state image pickup device 100b are therefore shown in FIG. 7 and other portions are omitted. In FIG. 7, constituent elements already described with reference to FIG. 1A or 2 are represented by using identical reference numerals used in FIG. 1A or 2 and the description thereof is omitted.

The operation of the MOS type solid-state image pickup device 100b is similar to that of the MOS type solid-state image pickup device 100 of the first embodiment, and so the description thereof is omitted.

A MOS type solid state image pickup device according to still another modification of the first embodiment will be described with reference to FIG. 8A.

Figure 8A:
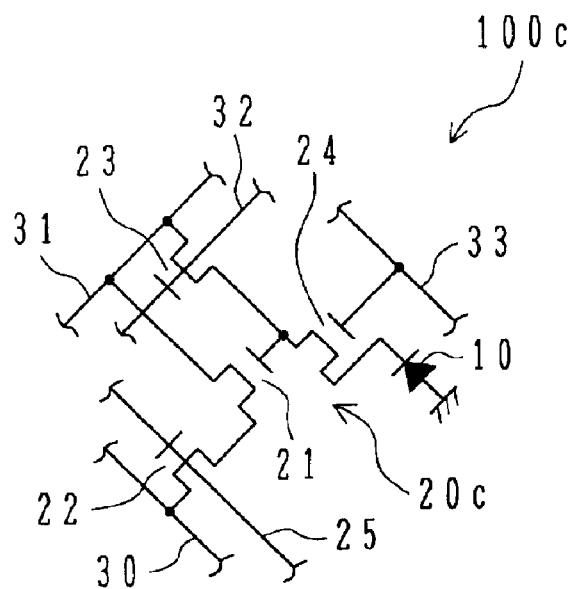
FIG. 8A is an equivalent circuit schematically showing an example of the switching circuit unit and a photoelectric conversion element of a MOS type solid state image pickup device according to still another modification of the first embodiment.

FIG. 8A is a diagram showing an example of the equivalent circuit of a switching circuit unit 20c and the photoelectric conversion element 10 constituting a MOS type solid state image pickup device 100c according to the modification.

As shown in FIG. 8A, in the MOS type solid state image pickup device 100c, the switching circuit unit 20c includes four transistors, an output transistor 21, a row select transistor 22, a reset transistor 23, and a transfer transistor 24. A power supply voltage wiring line 31 is disposed for each photoelectric conversion element row and extends along the corresponding row. A transfer signal wiring line 33 is disposed for each photoelectric conversion element row and extends along the corresponding row.

Each transfer transistor 24 is connected to the corresponding photoelectric conversion element 10 and output transistor 21. The control terminal (gate) of each transfer transistor 24 is electrically connected to the corresponding transfer signal supply wiring line 33.

Each transfer transistor 24 is, for example, a MOS transistor. Each transfer signal supply wiring line 33 is made of conductive material such as polysilicon, polycide, aluminum, tungsten, tungsten alloy, molybdenum and molybdenum alloy.

Each transfer signal supply wiring line 33 is electrically connected to the third scan unit. The third scan unit supplies transfer signals to each transfer signal supply wiring line 33 at a predetermined timing. The scan unit 60 shown in FIG. 1A may be used as the third scan unit.

A third control unit is provided for controlling the operation of the third scan unit. The control unit 70 shown in FIG. 1A may be used as the third control unit.

Other structures of the MOS type solid-state image pickup device 100*c* are similar to those of the MOS type solid-state image pickup device 100 of the first embodiment.

Only an equivalent circuit diagram of the switching circuit unit 20*c* and photoelectric conversion element 10 of the MOS type solid state image pickup device 100*c* is therefore shown in FIG. 8A and other portions are omitted. In FIG. 8A, constituent elements already described with reference to FIG. 1A or 2 are represented by using identical reference numerals used in FIG. 1A or 2 excepting the switching circuit unit 20*c*, and the description thereof is omitted.

When the transfer signal is supplied to the transfer transistor 24, the transfer transistor 24 turns on and the electric signal representing the amount of the signal charge accumulated in the corresponding photoelectric conversion element 10 is supplied to the control terminal (gate) of the corresponding output transistor 21.

The transfer signal to be supplied to the transfer transistor 24 is supplied synchronously with a predetermined timing during the horizontal blanking period, e.g., the timing when the row select signal is supplied to the corresponding row select transistor 22. The operation of the MOS type solid state image pickup device 100*c* excepting the operation of the transfer transistor 24 is similar to that of the MOS type solid state image pickup device 100 of the first embodiment and so the description thereof is omitted.

A MOS type solid state image pickup device according to still another modification of the first embodiment will be described with reference to FIG. 8B.

Figure 8B:
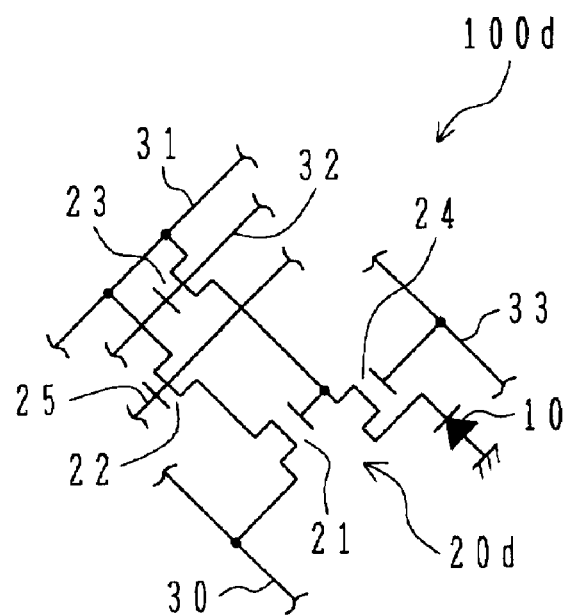
FIG. 8B is an equivalent circuit schematically showing an example of the switching circuit unit and a photoelectric conversion element of a MOS type solid state image pickup device according to still another modification of the first embodiment.

FIG. 8B is a diagram showing an example of the equivalent circuit of a switching circuit unit 20*d* and the photoelectric conversion element 10 constituting a MOS type solid state image pickup device 100*d* according to the modification.

As shown in FIG. 8B, in the MOS type solid state image pickup device 100*d*, the row select transistor 22 is connected to the power supply voltage wiring line 311 and the output transistor 21 is connected to the row select transistor 22 and output signal line 30. A row select signal wiring line 25 is disposed for each photoelectric conversion element row and extends along the corresponding row on the upper side thereof (upper side as viewed in FIG. 8B). Other structures are similar to those of the MOS type solid-state image pickup device 100*c* shown in FIG. 8A.

Only an equivalent circuit diagram of the switching circuit unit 20*d* and photoelectric conversion element 10 of the MOS type solid state image pickup device 100*d* is therefore shown in FIG. 8B and other portions are omitted. In FIG. 8B, constituent elements already described with reference to FIG. 8A are represented by using identical reference numerals used in FIG. 8A and the description thereof is omitted.

The operation of the MOS type solid state image pickup device 100*d* is similar to that of the MOS type solid state image pickup device 100*c* shown in FIG. 8A, and so the description thereof is omitted.

A MOS type solid-state image pickup device according to the second embodiment will be described with reference to FIGS. 9 and 10.

Figure 9:
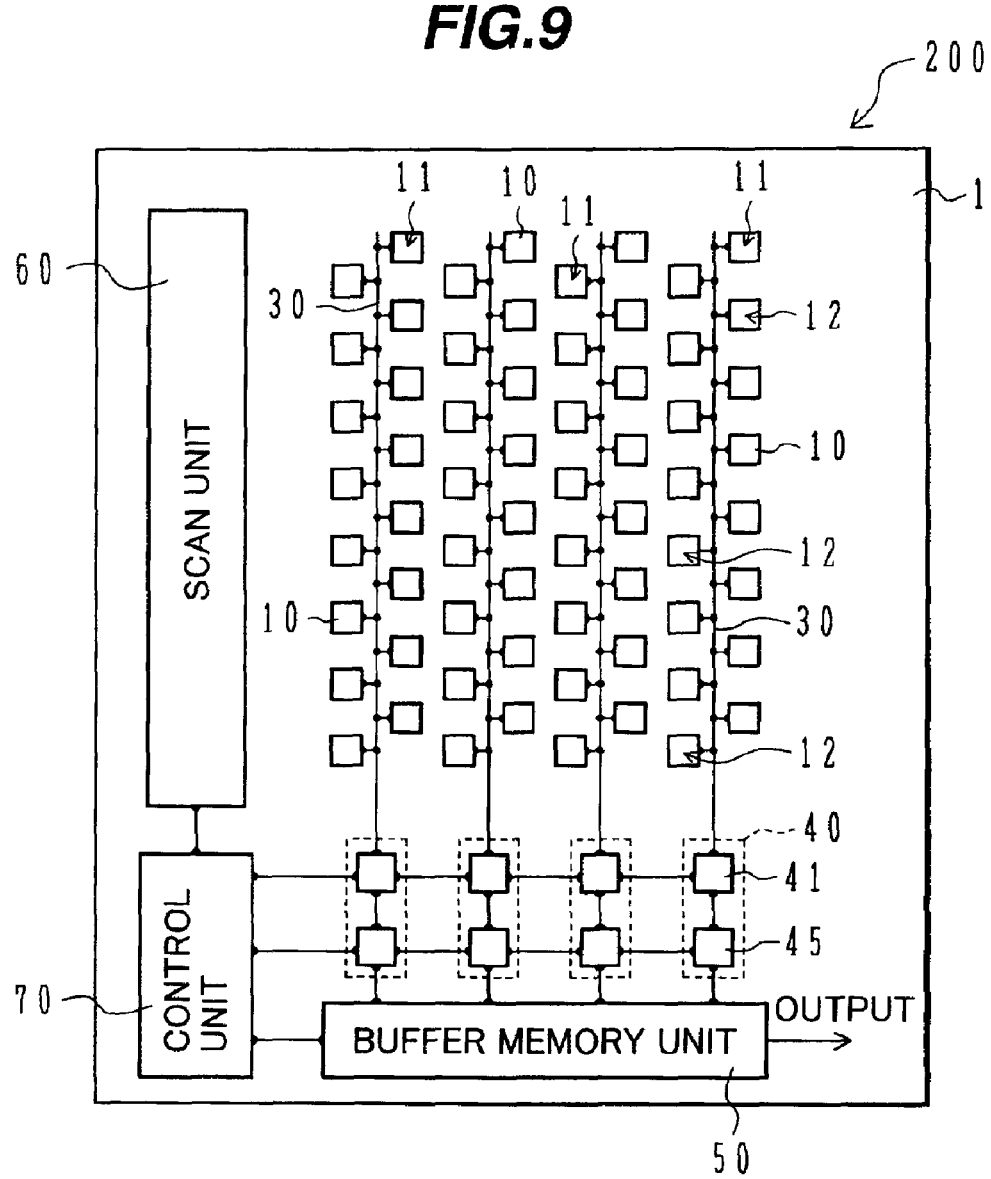
FIG. 9 is a schematic plan view of a MOS type solid-state image pickup device according to a second embodiment of the invention.

FIG. 9 is a schematic plan view of a MOS type solid-state image pickup device 200 of the second embodiment.

Figure 10:
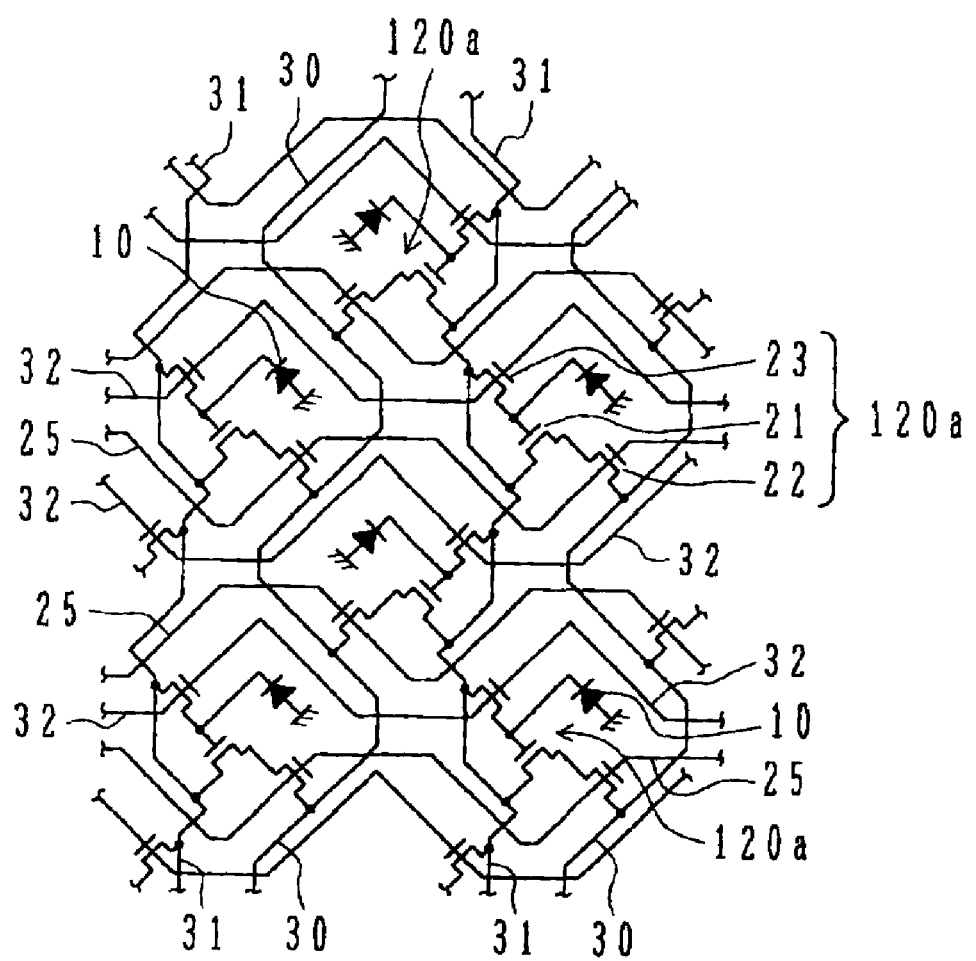
FIG. 10 is an equivalent circuit schematically showing an example of the switching circuit units and photoelectric conversion elements of the MOS type solid-state image pickup device of the second embodiment.

FIG. 10 is a diagram showing an example of the equivalent circuit of the switching circuit units 120*a* and the photoelectric conversion elements 10 constituting the MOS type solid-state image pickup device 200 shown in FIG. 9.

The MOS type solid state image pickup device 200 of the second embodiment is different from the MOS type solid state image pickup device 100 of the first embodiment in that (i) one output signal line 30 is disposed for each pair of adjacent photoelectric conversion element columns 11 with positioning therebetween as viewed in plan, (ii) one power supply voltage wiring line 31 is disposed for each pair of adjacent photoelectric conversion element columns 11 with positioning therebetween as viewed in plan, (iii) one A/D conversion unit 40 is provided per each output signal line 30, and (iv) one load transistor 35 (refer to FIG. 4) is provided per each output signal wiring line 30.

In the MOS type solid state image pickup device 200 shown in FIG. 9, the output signal line 30 and power supply voltage wiring line 31 are each disposed between different pairs of adjacent photoelectric conversion element columns 11. They may be disposed between the same pair of adjacent two photoelectric conversion element columns 11.

The structure of the MOS type solid state image pickup device 200 excepting the above points (i) to (iv) is similar to that of the MOS type solid state image pickup device 100 of the first embodiment, and the operation thereof is similar to that of the MOS type solid state image pickup device 100 of the first embodiment.

Portions other than those of the MOS type solid-state image pickup device 200 shown in FIG. 9 or 10 are therefore omitted. In FIGS. 9 and 10, constituent elements already described with reference to FIG. 1A or 2 are represented by using identical reference numerals used in FIG. 1A or 2 and the description thereof is omitted. The description of the operation of the MOS type solid-state image pickup device 200 is also omitted.

A MOS type solid-state image pickup device according to a modification of the second embodiment will be described with reference to FIG. 11.

Figure 11:
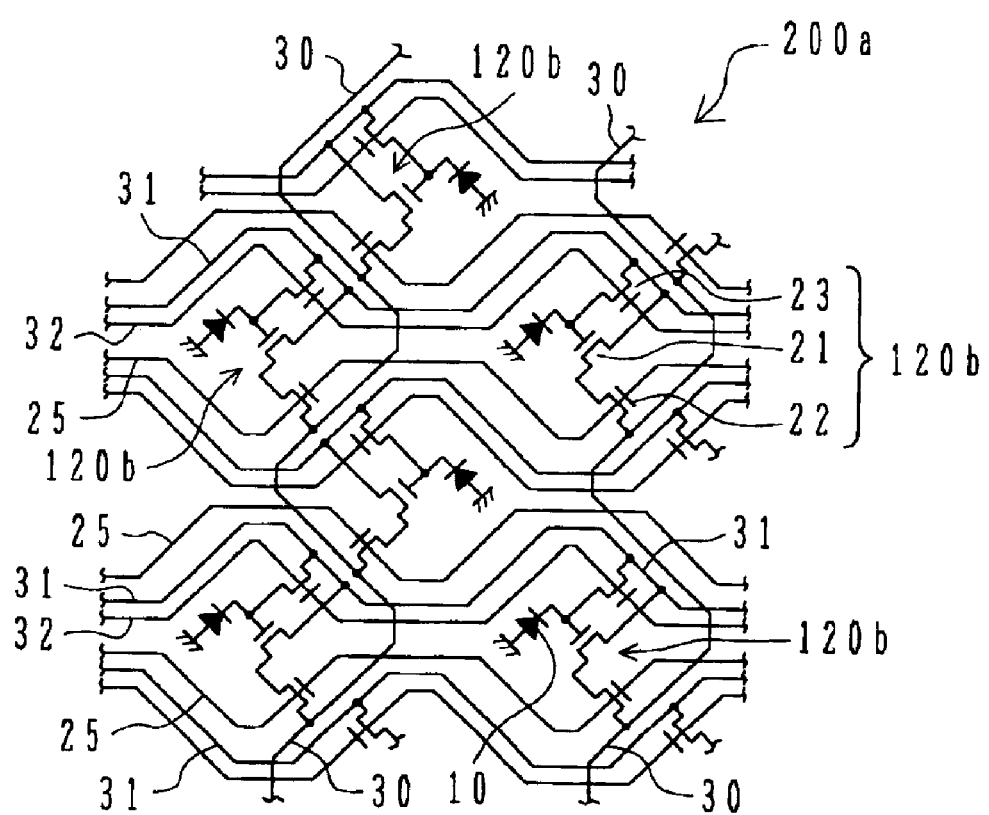
FIG. 11 is an equivalent circuit schematically showing an example of the switching circuit units and photoelectric conversion elements of a MOS type solid-state image pickup device according to a modification of the second embodiment.

FIG. 11 is a diagram showing an example of the equivalent circuit of the switching circuit units 120*b* and the photoelectric conversion elements 10 constituting a MOS type solid-state image pickup device 200*a* according to the modification.

As shown in FIG. 11, in the MOS type solid-state image pickup device 200*a*, a power supply voltage wiring line 31 is disposed for each photoelectric conversion element row and extends along the corresponding row. Other structures are similar to those of the MOS type solid-state image pickup device 200 of the second embodiment described with reference to FIGS. 9 and 10.

Only an equivalent circuit diagram of the switching circuit units 120*b* and the photoelectric conversion elements 10 of the MOS type solid-state image pickup device 200*a* is therefore shown in FIG. 11 and other portions are omitted.

In FIG. 11, constituent elements already described with reference to FIG. 9 or 10 are represented by using identical reference numerals used in FIG. 9 or 10 and the description thereof is omitted.

In the MOS type solid state image pickup device 200a, the output signal lines 30 and power supply voltage wiring lines 31 are disposed crossing each other so that different wiring layers for forming these lines are required.

The operation of the MOS type solid-state image pickup device 200a is similar to that of the MOS type solid-state image pickup device 200 of the second embodiment, and so the description thereof is omitted.

Although not shown, similar to the MOS type solid state image pickup devices 100c or 100d described with reference to FIG. 8A or 8B, in the MOS type solid state image pickup device 200 of the second embodiment, each switching circuit unit 120a may be include four transistors, an output transistor 21, a row select transistor 22, a reset transistor 23 and a transfer transistor 24.

The MOS type solid state image pickup device 200 having the switching circuit unit including four transistors operates in a similar manner to that of the MOS type solid state image pickup device 100c or 100d already described.

A MOS type solid-state image pickup device according to the third embodiment will be described with reference to FIG. 12.

Figure 12:
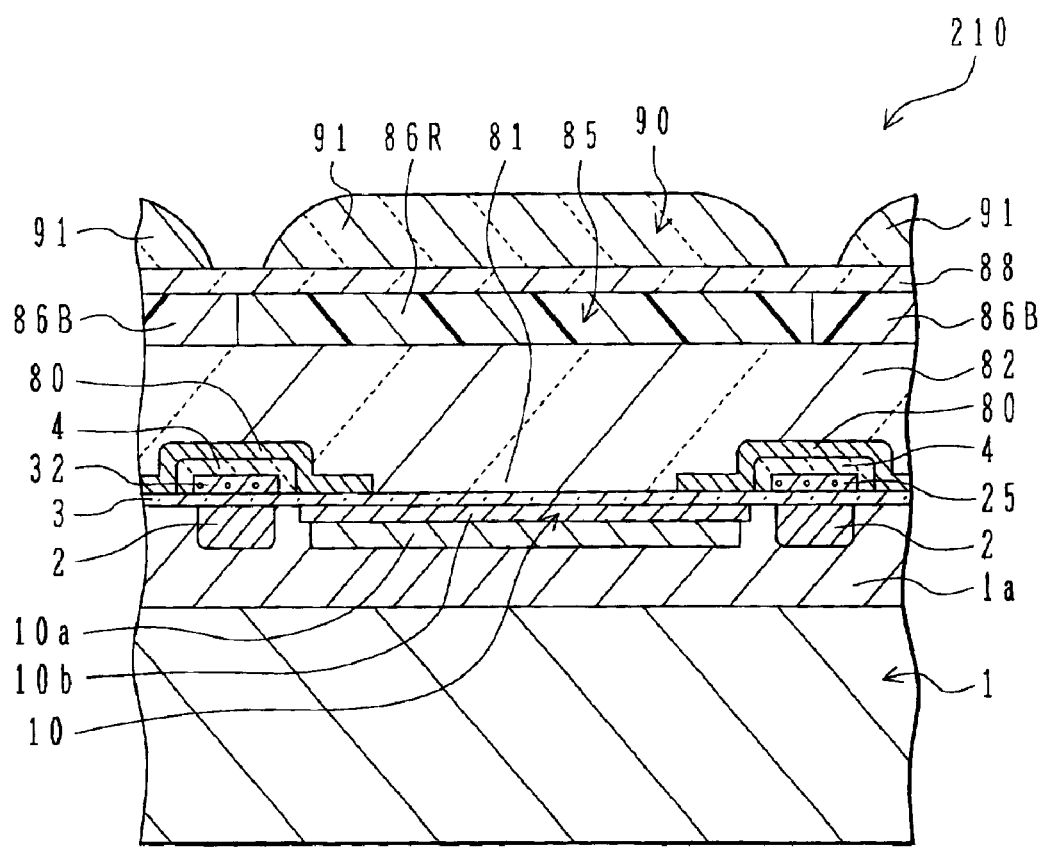
FIG. 12 is a cross sectional view schematically showing a MOS type solid-state image pickup device according to a third embodiment of the invention.

FIG. 12 is a schematic cross sectional view of a MOS type solid-state image pickup device 210 according to the third embodiment. The MOS type solid state image pickup device 210 shown in FIG. 12 is a MOS type solid state color image pickup device having light shielding film 80, a color filter array 85, a micro lens array 90 and the like added to the MOS type solid state image pickup device 100 of the first embodiment.

The cross sectional view showing the semiconductor substrate 1, photoelectric conversion element 10, row select signal wiring line 25 and reset signal supply wiring line 32 shown in FIG. 12 is almost the same as a cross sectional view of the MOS type solid state image pickup device 100 taken along line A—A shown in FIG. 3.

As shown in FIG. 12, the MOS type solid-state image pickup device 210 has an n-type silicon semiconductor substrate 1 with p-type wells 1a formed in a surface of the substrate 1.

A number of photoelectric conversion elements 10 or photodiodes are disposed in the semiconductor substrate 1 in the pixel shift layout. In FIG. 12, only one photoelectric conversion element 10 is shown.

Each photoelectric conversion element 10 is a buried type photodiode formed by forming an n-type region 10a in a predetermined area of the p-type well 1a and by forming a p$^+$-type region 10b in the surface of the n-type region 10a. Each photoelectric conversion element 10 is surrounded as viewed in plan by a channel stop region 2 formed in the p-type well 1a.

An electrically insulating film 3 made of, for example, a thermal oxidation film, is formed on the surface of the semiconductor substrate 1 on the photoelectric conversion element 10 side.

The output transistors 21, row select transistors 22, reset transistors 23, row select signal wiring lines 25, output signal lines 30, power supply voltage wiring lines 31 and reset signal supply wiring lines 32 described along with the MOS type solid state image pickup device 100 are formed on or above the electrically insulating layer 3. In FIG. 12, one row select signal wiring line 25 and one reset signal supply wiring line 32 can be seen. The surfaces of the row select signal wiring line 25 and reset signal supply wiring line 32 are covered with an electrically insulating layer 4 made of, for example, a thermal oxidation film.

The load transistors 35, AND conversion units 40, buffer memory unit 50, scan unit 60 and control unit 70 described along with the MOS type solid state image pickup device 100 are formed in or on predetermined areas of the semiconductor substrate 1.

The light shielding film 80 is formed in order to prevent unnecessary photoelectric conversion in the area other than photoelectric conversion elements 10. The light shielding film 80 has openings 81 at positions corresponding to photoelectric conversion elements 10.

The light shielding film 80 is made of: a metal thin film of aluminum, chrome, tungsten, titanium, molybdenum or the like; an alloy thin film made of two or more of these metals; or a multi-layer metal thin film made of the metal thin films or a combination of at least one metal thin film and at least one alloy thin film.

The light shielding film 80 and underlying (on the substrate side) members made of semiconductor or metal are insulated by the electrically insulating layer 3 or 4 or an unrepresentative electrically insulating layer.

A planarized film 82 covers the light shielding film 80 and the electrically insulating layer 3 exposed in the openings 81. The planarized film 82 is also utilized as a focus adjusting layer for micro lenses 91 to be described later. Inner lenses may be formed in the planarized film 82.

For example, the planarized film 82 is formed by coating transparent resin such as photoresist to a desired thickness by spin coating or the like.

The color filter array 85 is formed on the planarized film 82. This color filter array 85 is composed of color filters for color image pickup disposed in a predetermined patter. Such a color filter array may be a filter array of three primary colors (red, green, blue) or a so-called complementary color filter array.

A color filter of a desired color is disposed for each photoelectric conversion element 10 thereover. In this embodiment, red color filters 86R, green color filters 86G and blue color filters 86B are disposed in a predetermined layout. In FIG. 12, a red color filter 86R and two blue color filters 86B can be seen.

In the color filter array 85, color filter columns each of which is composed of only green color filters 86G are alternately disposed with color filter columns each of which is composed of red and blue color filters 86R and 86B disposed by turns. As viewed along the row direction, color filter rows each of which is composed of only green color filters 86G are alternately disposed with color filter rows each of which is composed of red and blue color filters 86R and 86B disposed by turns. Each color filter column extends in the same direction as the photoelectric conversion element column.

Figure 13A:
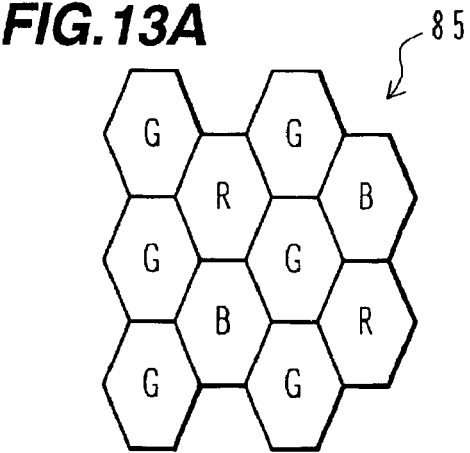
FIG. 13A is a plan view showing an example of the layout of color filters of a filer array of three primary colors.

FIG. 13A shows the layout of color filters of the color filter array 85 of this embodiment. In FIG. 13A, alphabets R, G and B represent the colors of color filters. The color filter array 85 is a filter array of three primary colors.

The color filter array 85 can be formed by forming resin (color resin) layers each of which is added with desired color pigment or dye on predetermined areas by photolithography or the like.

As shown in FIG. 12, a second planarized film 88 is formed on the color filter array 85. For example, the second planarized film 88 is formed by coating transparent resin such as photoresist to a desired thickness by spin coating or the like.

A micro lens array 90 is formed on the second planarized film 88. This micro lens array 90 has a number of micro lenses 91. One micro lens 91 is disposed for each photoelectric conversion element 10 thereover.

For example, these micro lenses 91 can be formed by dividing a transparent resin (e.g., photoresist) layer having a refractive index of about 1.3 to 2.0 into predetermined number of sections by photolithography or the like, melting each section by a heat treatment to round the corner thereof by surface tension, and thereafter cooling it.

Since the MOS type solid-state image pickup device 210 has the light shielding film 80, it is possible to prevent unnecessary photoelectric conversion in the area other than photoelectric conversion elements 10. Since the color filter array 85 is used, digital color image data can be obtained. Since the micro lens array 90 is used, light utilization efficiency is high.

In place of the filter array of three primary colors, a so-called complementary color filter array may be used. The complementary color filter array may be composed, for example, of: (i) green (G), cyan (Cy) and yellow (Ye) color filters; (ii) yellow (Ye), cyan (Cy) and magenta (Mg) color filters; (iii) cyan (Cy), green (G), yellow (Ye) and magenta (Mg) color filters; or the like.

FIGS. 13B, 13C, 13D and 13E show examples of the layout of color filters of the complementary color filter array.

Figure 13B:
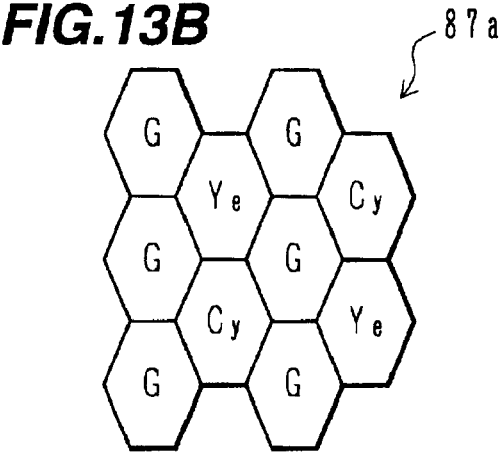
FIGS. 13B, 13C, 13D and 13E are plan views showing examples of the layout of color filters of a complementary color filter array.
Figure 13C:
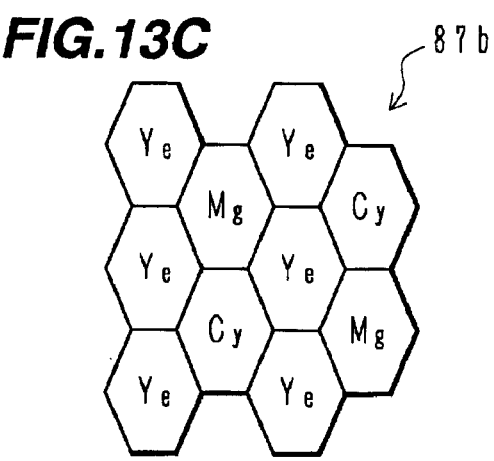
Figure 13D:
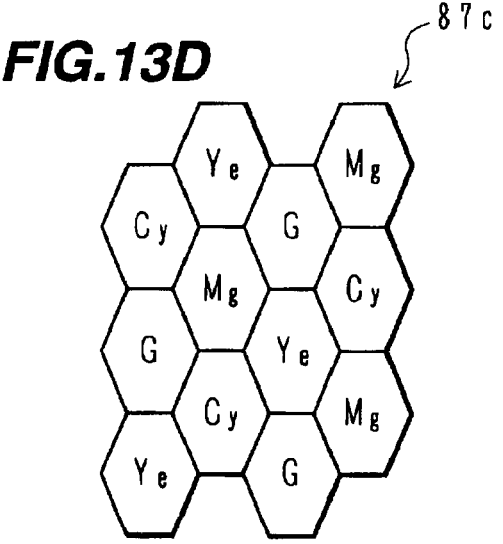
Figure 13E:
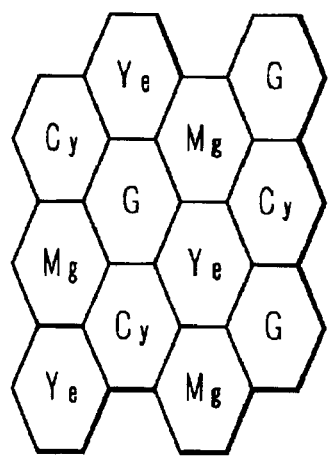

FIG. 13B is a plan view showing an example of the layout of color filters of a color filter array 87a of the complementary color type (i). FIG. 13C is a plan view showing an example of the layout of color filters of a color filter array 87b of the complementary color type (ii). FIG. 13D is a plan view showing an example of the layout of color filters of a color filter array 87c of the complementary color type (iii). FIG. 13E is a plan view showing an example of the layout of color filters of a color filter array 87d also of the complementary color type (iii). In FIGS. 13B to 13E, a hexagon surrounding each of alphabets G, Cy, Ye and Mg indicates a color filter. The alphabets G, Cy, Ye and Mg represent the colors of color filters.

The color filter array of three primary colors or complementary color filter array may be applied to a MOS type solid state image pickup device according to the embodiment other than the first embodiment or to the modification thereof to obtain a MOS type solid state color image pickup device.

The light shielding film and micro lens array are not the essential components for obtaining a MOS type solid-state color image pickup device. However, in practice, it is preferable to form the light shielding film and micro lens array.

The light shielding film and micro lens array may be formed for a black and white MOS type solid-state image pickup device.

Each of the MOS type solid-state image pickup devices of the embodiments and modifications has a number of photoelectric conversion elements disposed in the pixel shift layout.

With the pixel shift layout of a number of photoelectric conversion elements, each photoelectric conversion element row is made of photoelectric conversion elements only in the even or odd columns. The output transistors corresponding to photoelectric conversion elements in the odd columns generate electric signals on the output signal lines at a timing different from that of the output transistors corresponding to photoelectric conversion elements in the even columns.

Therefore, an A/D conversion unit provided for a pair of adjacent photoelectric conversion element columns can receive an electric signal generated by an output transistor corresponding to a photoelectric conversion element, separately in the odd column and even column, and can generate a digital signal representing the electric signal.

As already described with given embodiments and modifications thereof, the total number of A/D conversion units can be reduced to a half of the total number of photoelectric conversion element columns. Namely, the total number of A/D conversion units can be halved as compared to a conventional MOS type solid-state image pickup device.

As a result, even if the effective integration degree of photoelectric conversion elements is raised, A/D conversion units can be formed without using sophisticated micro patterning techniques. The manufacture cost can therefore be reduced correspondingly.

The present invention has been described in connection with the preferred embodiments and modifications of a MOS type solid-state image pickup device. The invention is not limited only to the above embodiments or modifications. It is apparent that various modifications, improvements, combinations, and the like can be made by those skilled in the art.

According to the invention, the integration degree of photoelectric conversion elements can be raised while an increase in the manufacture cost of a MOS type solid state image pickup device with built-in A/D conversion units is suppressed.

We claim:

1. A solid-state image pickup device, comprising:

a number of photoelectric conversion elements disposed in a plurality of rows and columns in a surface of a semiconductor substrate, each photoelectric conversion element of a photoelectric conversion element column of an even number being shifted in a column direction by about a half pitch between photoelectric conversion elements in each photoelectric conversion element column, relative to each photoelectric conversion element of a photoelectric conversion element column of an odd number, and each photoelectric conversion element of a photoelectric conversion element row of an even number being shifted in a row direction by about a half pitch between photoelectric conversion elements in each photoelectric conversion element row, relative to each photoelectric conversion element of a photoelectric conversion element row of an odd number, so that each photoelectric conversion element row includes photoelectric conversion elements of only the odd or even columns;

a switching circuit unit provided per each photoelectric conversion element, said switching circuit unit including an output transistor capable of generating an electric images signal representing an amount of a signal charge accumulated in a corresponding photoelectric conversion element;

a row select signal wiring line provided per each photoelectric conversion element row and extending along a corresponding photoelectric conversion element row, said row select signal wiring line connected to and supplying a row select signal to associated switching circuit units of odd or even columns, the row select signal controlling generation of the electric image signal;

an analog/digital conversion unit provided for each pair of adjacent photoelectric conversion element columns, and comprising a common sample/hold circuit and a common A/D converter; and an output signal line electrically connecting said analog/digital conversion unit and the output transistors in said each pair of adjacent photoelectric conversion element columns.

2. A solid-state image pickup device according to claim 1, wherein said output signal line comprises two subsidiary output signal lines for each photoelectric conversion element column, extending along the associated photoelectric conversion element column.

3. A solid-state image pickup device according to claim 1, wherein said output signal line comprises a common output signal line disposed between said pair of adjacent photoelectric conversion element columns.

4. A solid-state image pickup device according to claim 1, further comprising a first scan unit for sequentially supplying the row select signal to said row select signal wiring lines one at a time to select an odd-column row and an even-column row alternately.

5. A solid-state image pickup device according to claim 4, further comprising a first control unit for controlling an operation of said first scan unit.

6. A solid-state image pickup device according to claim 1, further comprising at least one power supply voltage wiring line electrically connected to each of said output transistors for supplying a power supply voltage to the output transistors, wherein:

each of said output transistors receives at its control terminal an electric signal representing the amount of the signal charge accumulated in a corresponding photoelectric conversion element; and each of said switching circuit units further comprises a row select transistor connected to said output transistor by serial connection, said row select transistor receiving at its control terminal the row select signal, the serial connection being interposed between a corresponding output signal line and said power supply voltage wiring line with electrically connecting to the output signal line and power supply voltage wiring line.

7. A solid-state image pickup device according to claim 6, wherein:

each of said switching circuit units further comprises a reset transistor electrically connected to a corresponding photoelectric conversion element and said power supply voltage wiring line, said reset transistor being interposed between a control terminal of said corresponding output transistor and said power supply voltage wiring line; and the solid-state image pickup device further comprises a reset signal supply wiring line provided for each photoelectric conversion element row and extending along a corresponding photoelectric conversion element row, said reset signal supply wiring line being electrically connected to control terminals of corresponding reset transistors.

8. A solid-state image pickup device according to claim 7, further comprising a second scan unit for supplying a control signal for said reset transistor to each of said reset signal supply wiring lines at a predetermined timing.

9. A solid-state image pickup device according to claim 8, further comprising a second control unit for controlling an operation of said second scan unit.

10. A solid-state image pickup device according to claim 1, wherein:

each of said switching circuit units further comprises a transfer transistor electrically connected to a corresponding photoelectric conversion element and a corresponding output transistor, said transfer transistor being interposed between said corresponding photoelectric conversion element and said corresponding output transistor; and the solid-state image pickup device further comprises a transfer control signal supply wiring line provided for each photoelectric conversion element row and extending along a corresponding photoelectric conversion element row, said transfer control signal supply wiring line being electrically connected to control terminals of corresponding transfer transistors.

11. A solid-state image pickup device according to claim 10, further comprising a third scan unit for supplying a control signal for said transfer transistor to each of said transfer control signal wiring lines at a predetermined timing.

12. A solid-state image pickup device according to claim 11, further comprising a third control unit for controlling an operation of said third scan unit.

13. A solid-state image pickup device according to claim 1, wherein each of said analog/digital conversion units includes a sample/hold circuit unit having a capacitor and an analog/digital converter for converting an output of said sample/hold circuit unit into a digital signal.

14. A solid-state image pickup device according to claim 13, wherein each of said analog/digital converter includes:

a comparator for comparing a voltage of output signal output from said sample/hold circuit unit with a reference voltage signal, said comparator outputting a control operation signal when the reference voltage signal externally supplied to said comparator becomes equal to the voltage of output signal output from said sample/hold circuit; and a latch circuit for receiving the control operation signal and a count signal, latching the count of the count signal externally supplied to said latch circuit when the control operation signal is supplied, and outputting an electric signal representing the count latched.

15. A solid-state image pickup device according to claim 1, further comprising a fourth control unit for controlling an operation of each of said analog/digital conversion units.

16. A solid-state image pickup device according to claim 1, further comprising a buffer memory unit for temporarily storing the digital signals output from each of said analog/digital conversion units and outputting the digital signals.

17. A solid-state image pickup device according to claim 1, further comprising a fifth control unit for controlling an operation of said buffer memory unit.

18. A solid-state image pickup device according to claim 1, further comprising: a color filter disposed for each of said photoelectric conversion elements thereover; and a micro lens disposed for each of said color filters thereover.

* * * * *